US012479422B2

(12) United States Patent
Yershov et al.

(10) Patent No.: US 12,479,422 B2
(45) Date of Patent: Nov. 25, 2025

(54) VEHICLE OPERATION USING A DYNAMIC OCCUPANCY GRID

(71) Applicant: Motional AD LLC, Boston, MA (US)

(72) Inventors: Dmytro S. Yershov, Boston, MA (US); Matthias Sapuan, Singapore (SG)

(73) Assignee: Motional AD LLC, Boston, MA (US)

(*) Notice: Subject to any disclaimer, the term of this patent is extended or adjusted under 35 U.S.C. 154(b) by 223 days.

(21) Appl. No.: 18/381,689

(22) Filed: Oct. 19, 2023

(65) Prior Publication Data

US 2024/0042995 A1 Feb. 8, 2024

Related U.S. Application Data

(63) Continuation of application No. 17/318,433, filed on May 12, 2021, now Pat. No. 11,814,039.

(Continued)

(51) Int. Cl.
*B60W 30/08* (2012.01)
*G06F 17/14* (2006.01)
*G06V 20/56* (2022.01)

(52) U.S. Cl.
CPC ............ *B60W 30/08* (2013.01); *G06V 20/56* (2022.01); *B60W 2420/408* (2024.01);
(Continued)

(58) Field of Classification Search
CPC .......... B60W 30/08; B60W 2420/408; B60W 2554/4029; B60W 2554/4049;
(Continued)

(56) References Cited

U.S. PATENT DOCUMENTS

| 10,303,178 B1 | 5/2019 | Gutmann et al. |
| 11,073,832 B1 | 7/2021 | Gutmann |

(Continued)

FOREIGN PATENT DOCUMENTS

| CN | 107180146 | 9/2017 |
| CN | 109782763 | 5/2019 |

(Continued)

OTHER PUBLICATIONS

[No Author Listed], "J3016: Taxonomy and Definitions for Terms Related to On-Road Motor Vehicle Automated Driving Systems" SAE International, Sep. 2016, 30 pages.

(Continued)

*Primary Examiner* — Peter D Nolan
*Assistant Examiner* — Anwar Mohamed
(74) *Attorney, Agent, or Firm* — Fish & Richardson P.C.

(57) ABSTRACT

Methods for operating a vehicle in an environment include receiving light detection and ranging (LiDAR) data from a LiDAR of the vehicle. The LiDAR data represents objects located in the environment. A dynamic occupancy grid (DOG) is generated based on a semantic map. The DOG includes multiple grid cells. Each grid cell represents a portion of the environment. For each grid cell, a probability density function is generated based on the LiDAR data. The probability density function represents a probability that the portion of the environment represented by the grid cell is occupied by an object. A time-to-collision (TTC) of the vehicle and the object less than a threshold time is determined based on the probability density function. Responsive to determining that the TTC is less than the threshold time, a control circuit of the vehicle operates the vehicle to avoid a collision of the vehicle and the object.

21 Claims, 21 Drawing Sheets

Related U.S. Application Data

(60) Provisional application No. 63/023,337, filed on May 12, 2020.

(52) U.S. Cl.
CPC .............. *B60W 2554/4029* (2020.02); *B60W 2554/4049* (2020.02); *G06F 17/14* (2013.01)

(58) Field of Classification Search
CPC .............. B60W 30/09; B60W 50/14; B60W 2050/0005; B60W 2050/0052; G06V 20/56; G06V 20/58; G06F 17/14; G06F 17/18; G01S 17/89; G01S 17/931; G01C 21/3492; G06N 20/00
See application file for complete search history.

(56) References Cited

U.S. PATENT DOCUMENTS

| | | | |
|---|---|---|---|
| 11,320,826 B2 * | 5/2022 | Vora | G05D 1/228 |
| 11,449,705 B2 | 9/2022 | Yershov et al. | |
| 11,555,927 B2 * | 1/2023 | Huang | G01S 17/89 |
| 11,762,094 B2 * | 9/2023 | Laddha | G06T 7/20 |
| | | | 701/25 |
| 11,814,039 B2 | 11/2023 | Yershov et al. | |
| 12,037,012 B2 * | 7/2024 | Li | G06N 3/045 |
| 12,296,819 B2 * | 5/2025 | Wongpiromsarn | |
| | | | B60W 30/095 |
| 2002/0152156 A1 | 10/2002 | Tyson-Quah et al. | |
| 2004/0133509 A1 | 7/2004 | McCoy et al. | |
| 2005/0234679 A1 | 10/2005 | Karlsson | |
| 2008/0027591 A1 | 1/2008 | Lenser et al. | |
| 2012/0053755 A1 | 3/2012 | Takagi | |
| 2017/0124476 A1 | 5/2017 | Levinson et al. | |
| 2017/0161946 A1 | 6/2017 | Aghamohammadi et al. | |
| 2017/0256071 A1 | 9/2017 | Laugier et al. | |
| 2018/0113209 A1 | 4/2018 | Campbell | |
| 2018/0247216 A1 | 8/2018 | Mottin et al. | |
| 2018/0307245 A1 | 10/2018 | Khawaja et al. | |
| 2018/0373264 A1 | 12/2018 | Madsen et al. | |
| 2019/0049239 A1 | 2/2019 | Natroshvili et al. | |
| 2019/0258251 A1 | 8/2019 | Ditty et al. | |
| 2020/0086855 A1 | 3/2020 | Pack et al. | |
| 2020/0189575 A1 * | 6/2020 | Wongpiromsarn | G08G 1/166 |
| 2020/0225622 A1 * | 7/2020 | Buerkle | G01S 15/04 |
| 2020/0257931 A1 | 8/2020 | Yershov et al. | |
| 2020/0271787 A1 | 8/2020 | You et al. | |
| 2021/0073321 A1 | 3/2021 | Steyer et al. | |
| 2021/0131823 A1 | 5/2021 | Giorgio et al. | |
| 2021/0354690 A1 | 11/2021 | Yershov et al. | |
| 2023/0288568 A1 * | 9/2023 | Heo | G01S 17/58 |
| 2025/0123390 A1 * | 4/2025 | Appaya Dhanabalan | |
| | | | G01S 13/865 |
| 2025/0130576 A1 * | 4/2025 | John Wilson | G01S 17/931 |

FOREIGN PATENT DOCUMENTS

| | | |
|---|---|---|
| CN | 109844562 | 6/2019 |
| CN | 112930554 | 6/2021 |
| CN | 114659530 | 6/2022 |
| EP | 3514648 | 7/2019 |
| JP | 2012-230604 | 11/2012 |
| JP | 2013-234919 | 11/2013 |
| JP | 2015-197417 | 11/2015 |
| KR | 10-2012-0008211 | 1/2012 |
| KR | 10-2018-0068711 | 6/2018 |
| WO | WO 2019141311 | 7/2019 |
| WO | WO 2019244060 | 12/2019 |
| WO | WO 2020053611 | 3/2020 |
| WO | WO 2021194590 | 9/2021 |

OTHER PUBLICATIONS

Danescu et al., "Modeling and Tracking the Driving Environment With a Particle-Based Occupancy Grid," IEE Transactions on Intelligent Transportation Systems, Dec. 2011, 12(4):1331-1342.

Erkent et al., "Semantic grid estimation with occupancy grids and semantic segmentation networks," 2018 15th International Conference on Control, Automation, Robotics and Vision (ICARCV), Nov. 18, 2018, 1051-6.

Nuss et al., "A Random Finite Set Approach for Dynamic Occupancy Grid Maps with Real-Time Application," International Journal of Robotics Research, 2018, 37(8):841-866.

Solanki, "Development of Sensor Component for Terrain Evaluation and Obstacle Detection for an Unmanned Autonomous Vehicle," Dissertation Presented to Florida University Gainesville, Chapter 4, May 2007, 45-49.

Tanzmeister et al., "Evidential Grid-Based Tracking and Mapping," IEEE Transactions on Intelligent Transportation Systems, Jun. 2017, 18; 1454-1467.

* cited by examiner

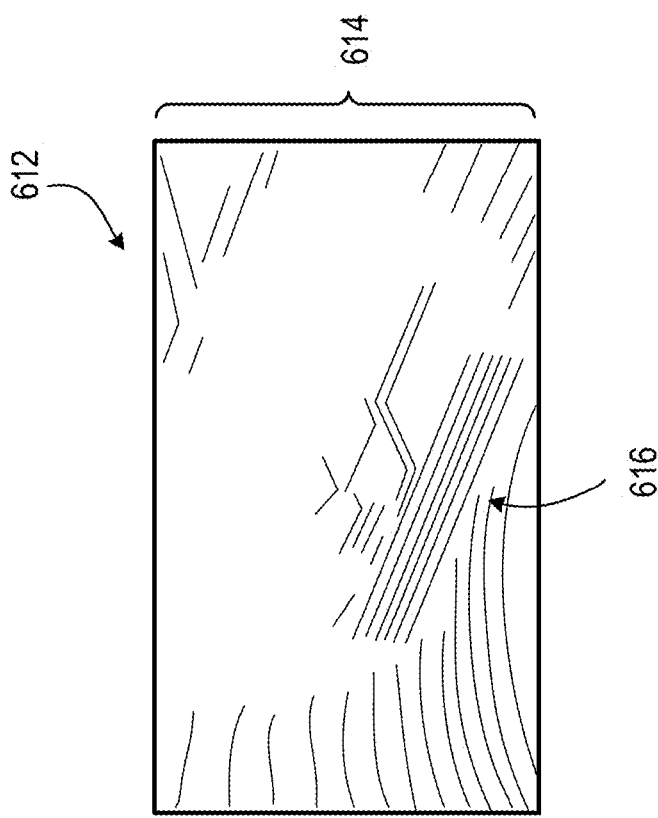
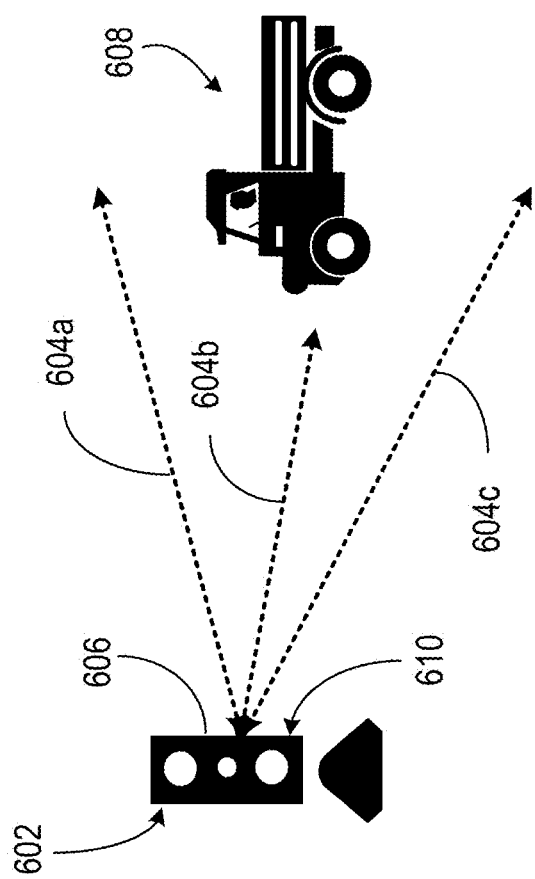
FIG. 6

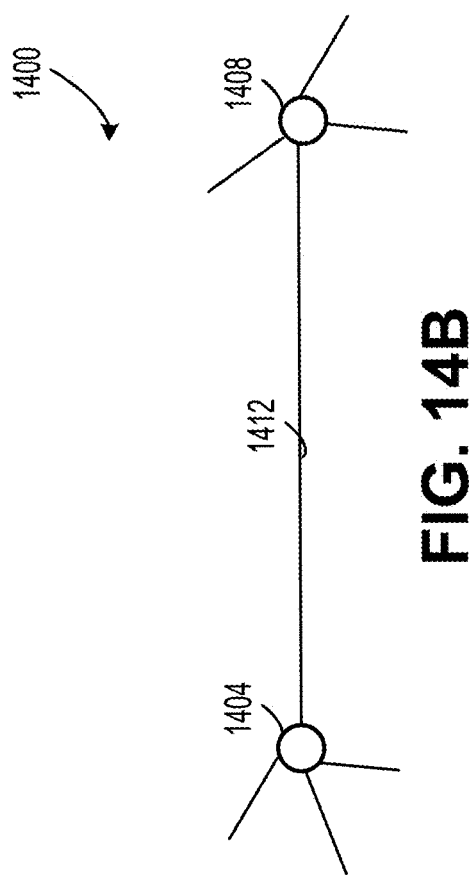

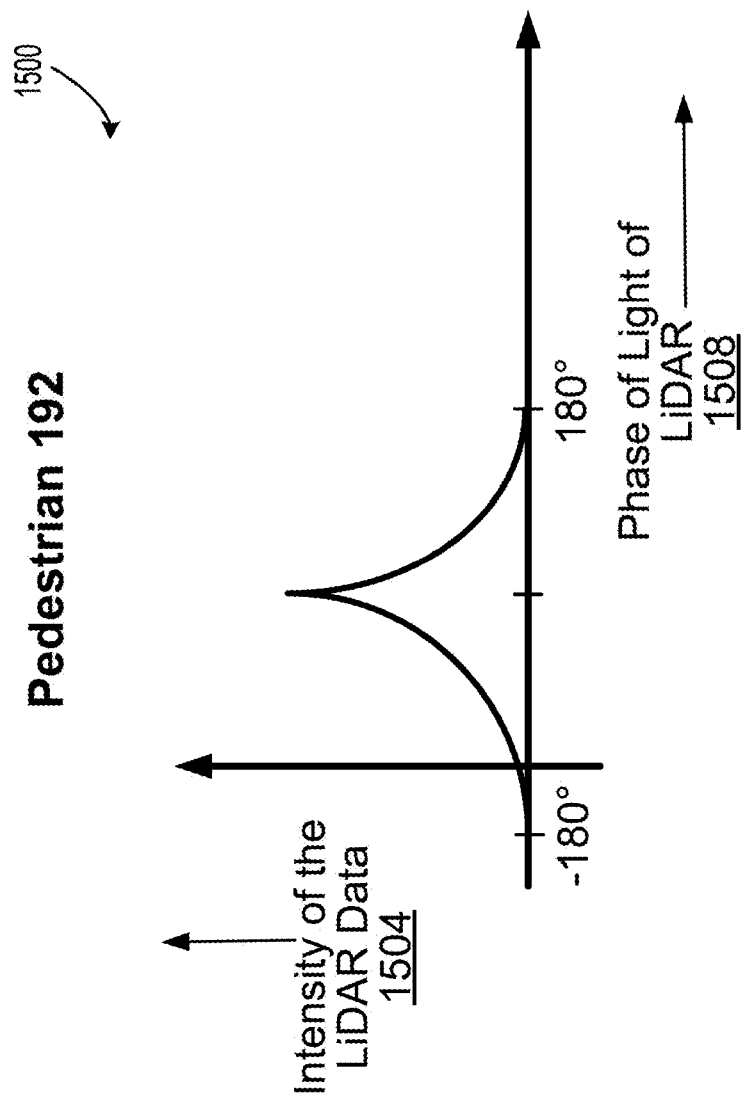

Receive, by one or more processors of a vehicle operating in an environment, light detection and ranging (LiDAR) data from one or more LiDARs of the vehicle, the LiDAR data representing one or more objects located in the environment
1704

Generate, by the one or more processors, a dynamic occupancy grid (DOG) based on a semantic map of the environment, the DOG comprising multiple grid cells, each grid cell of the plurality of grid cells representing a portion of the environment
1708

For each grid cell of the multiple grid cells, generate, by the one or more processors, a probability density function based on the LiDAR data, the probability density function representing a probability that the portion of the environment represented by the grid cell is occupied by an object of the one or more objects
1712

Determine, by the one or more processors, that a time-to-collision (TTC) of the vehicle and the object is less than a threshold time based on the probability density function
1716

Responsive to determining that the TTC is less than the threshold time, operating, by the one or more processors, the vehicle to avoid a collision of the vehicle and the object
1720

FIG. 17

Generate, by one or more processors of a vehicle, a dynamic occupancy graph representing a drivable area along a trajectory of the vehicle, the dynamic occupancy graph including at least two nodes and an edge connecting the two nodes, the two nodes representing two adjacent spatiotemporal locations of the drivable area
1804

Generate, by the one or more processors, a particle distribution function of multiple particles based on LiDAR data received from one or more LiDARs of the vehicle, the multiple particles representing at least one object in the drivable area, the edge of the dynamic occupancy graph representing motion of the at least one object between the two adjacent spatiotemporal locations of the drivable area
1808

Generate, by the one or more processors, a velocity of the object relative to the vehicle based on the particle distribution function
1812

Determine, by the one or more processors, a time-to-collision of the vehicle and the at least one object based on the particle distribution function
1816

Responsive to determining that the time-to-collision is less than a threshold time, transmitting, by the one or more processors, a collision warning to a control circuit of the vehicle to avoid a collision of the vehicle and the at least one object
1820

FIG. 18

Generate, by one or more processors of a vehicle operating in an environment, a dynamic occupancy grid (DOG) based on first LIDAR data received from a LIDAR of the vehicle
2004

Extract, by a particle filter executed by the one or more processors, a waveform from the dynamic occupancy grid, the waveform comprising a variation of an intensity of the LiDAR data with a phase of light of the LiDAR
2008

Match, by the one or more processors, the waveform against a library of waveforms extracted from historical LiDAR data reflected from one or more objects to identify that the first LiDAR data is reflected from a particular object of the one or more objects
2012

Update, by the one or more processors, the waveform based on second LiDAR data received from the LiDAR of the vehicle after the first LiDAR data is received
2016

Determine, by the one or more processors, a range rate of the vehicle and the particular object based on the updated waveform
2020

Operate, by a control circuit of the vehicle, the vehicle to avoid a collision with the particular object based on the range rate of the vehicle and the particular object
2024

FIG. 20

VEHICLE OPERATION USING A DYNAMIC OCCUPANCY GRID

CROSS-REFERENCE TO RELATED APPLICATIONS

This application is a continuation of U.S. application Ser. No. 17/318,433, filed May 12, 2021, now allowed, which claims the benefit of U.S. Provisional Application 63/023,337, filed on May 12, 2020, both of which is incorporated herein by reference in its entirety.

FIELD OF THE INVENTION

This description relates generally to operation of vehicles and specifically to vehicle operation using a dynamic occupancy grid.

BACKGROUND

Operation of a vehicle from an initial location to a final destination often requires a user or a vehicle's decision-making system to select a route through a road network from the initial location to a final destination. The route may involve meeting objectives, such as not exceeding a maximum driving time. A complex route can require many decisions, making traditional algorithms for autonomous driving impractical.

SUMMARY

Methods for operating a vehicle in an environment include using one or more processors of the vehicle to receive light detection and ranging (LiDAR) data from one or more LiDARs of the vehicle. The LiDAR data represents one or more objects located in the environment. The one or more processors generate a dynamic occupancy grid (DOG) based on a semantic map of the environment. The DOG includes multiple grid cells. Each grid cell represents a portion of the environment. For each grid cell, the one or more processors generate a probability density function based on the LiDAR data. The probability density function represents a first probability that the portion of the environment represented by the grid cell is occupied by an object. The one or more processors determine that a time-to-collision (TTC) of the vehicle and the object is less than a threshold time based on the probability density function. Responsive to determining that the TTC is less than the threshold time, a control circuit of the vehicle operates the vehicle to avoid a collision of the vehicle and the object.

In another aspect, one or more processors of a vehicle generate a dynamic occupancy graph representing a drivable area along a trajectory of the vehicle. The dynamic occupancy graph includes at least two nodes and an edge connecting the two nodes. The two nodes represent two adjacent spatiotemporal locations of the drivable area. The one or more processors generate a particle distribution function of multiple particles based on LiDAR data received from one or more LiDARs of the vehicle. The multiple particles represent at least one object in the drivable area. The edge of the dynamic occupancy graph represents motion of the at least one object between the two adjacent spatiotemporal locations of the drivable area. The one or more processors determine a velocity of the object relative to the vehicle based on the particle distribution function. The one or more processors determine a TTC of the vehicle and the at least one object based on the particle distribution function. Responsive to determining that the TTC is less than a threshold time, the one or more processors transmit a collision warning to a control circuit of the vehicle to avoid a collision of the vehicle and the at least one object.

In another aspect, one or more processors of a vehicle receive sensor data from one or more sensors of the vehicle. The sensor data has a latency. Responsive to determining that the latency is less than a threshold latency, the one or more processors execute a cyclic redundancy check on the sensor data. Responsive to determining that the sensor data passes the cyclic redundancy check, the one or more processors determine a discrete, binary occupancy probability for each grid cell of a dynamic occupancy grid using an inverse sensor model of the one or more sensors based on the sensor data. The occupancy probability denotes whether a portion of an environment in which the vehicle is operating is occupied by an object. The one or more processors determine a particle density function based on the occupancy probability using a kinetic function. Responsive to determining that the particle density function indicates that a TTC between the vehicle and the object is less than a threshold TTC, the one or more processors transmit a deceleration request to a control circuit of the vehicle.

In another aspect, one or more processors of a vehicle operating in an environment generate a DOG based on first LiDAR data received from a LiDAR of the vehicle. A particle filter executed by the one or more processors extracts a waveform from the DOG. The waveform includes a variation of an intensity of the LiDAR data with a phase of light of the LiDAR. The one or more processors match the waveform against a library of waveforms extracted from historical LiDAR data reflected from one or more objects to identify that the first LiDAR data is reflected from a particular object of the one or more objects. The one or more processors update the waveform based on second LiDAR data received from the LiDAR of the vehicle after the first LiDAR data is received. The one or more processors determine a range rate of the vehicle and the particular object based on the updated waveform. A control circuit of the vehicle operates the vehicle to avoid a collision with the particular object based on the range rate of the vehicle and the particular object.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 is a block diagram illustrating an example of a LiDAR system, in accordance with one or more embodiments.

FIG. 14B is a block diagram illustrating a dynamic occupancy graph, in accordance with one or more embodiments.

FIG. 15 illustrates a dynamic occupancy grid (DOG) waveform representing a pedestrian, in accordance with one or more embodiments.

FIG. 17 is a flow diagram illustrating a process for operation of a vehicle, in accordance with one or more embodiments.

FIG. 18 is a flow diagram illustrating a process for operation of a vehicle, in accordance with one or more embodiments.

FIG. 20 is a flow diagram illustrating a process for operation of a vehicle, in accordance with one or more embodiments.

DETAILED DESCRIPTION

Figure 1:
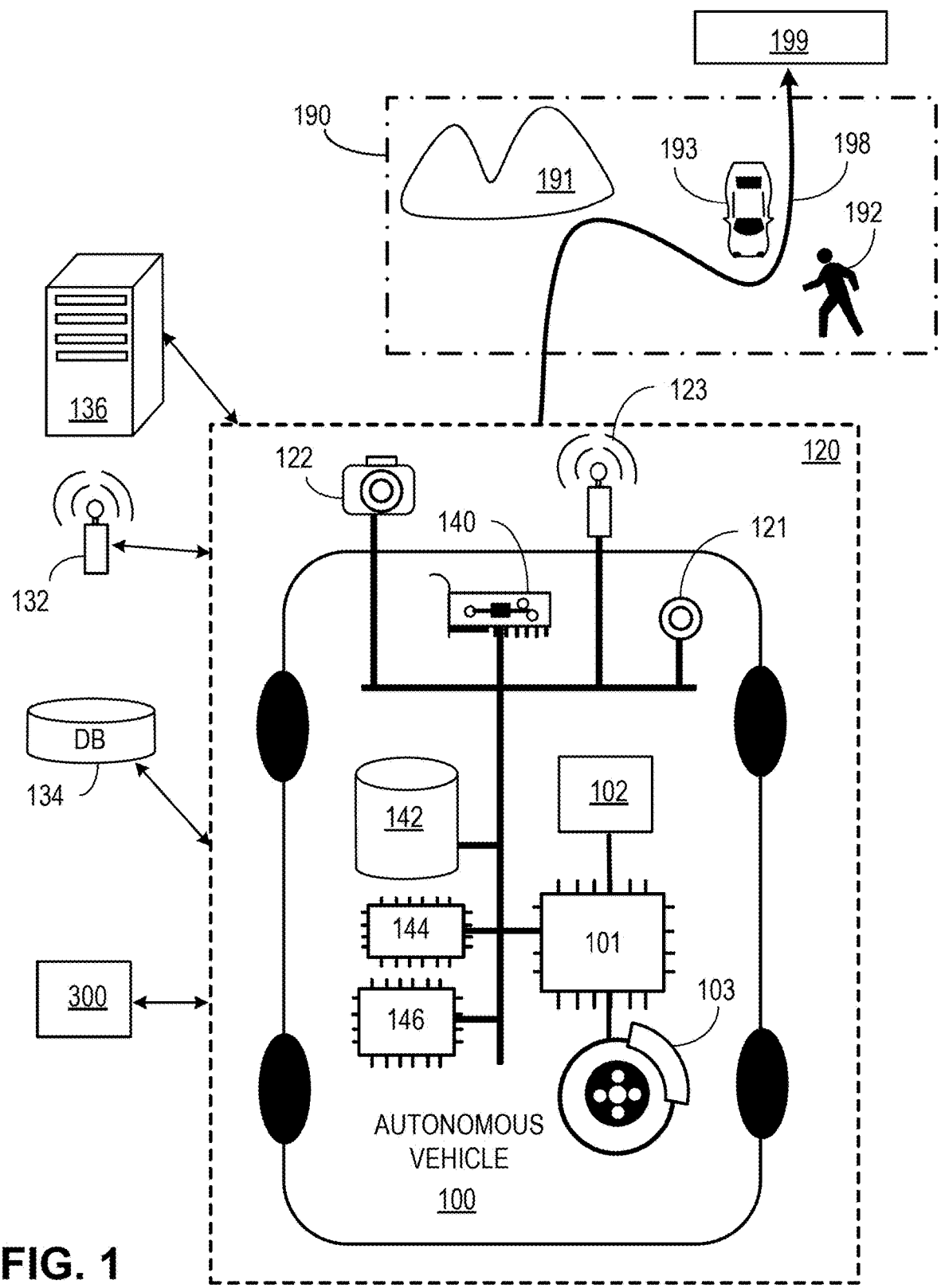
FIG. 1 is a block diagram illustrating an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in an embodiment.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
   2. System Overview
   3. Autonomous Vehicle Architecture
   4. Autonomous Vehicle Inputs
   5. Autonomous Vehicle Planning
   6. Autonomous Vehicle Control
   7. Autonomous Vehicle Operation Using a dynamic occupancy grid (DOG)
   8. Processes for Autonomous Vehicle Operation Using a DOG General Overview This document presents methods, systems, and apparatuses for operating an autonomous vehicle (AV) using a dynamic occupancy grid (DOG). The DOG is a representation of the characteristics of objects and free space in the environment of the AV. The environment of the AV is represented as a grid or mesh that is referred to as the DOG. The DOG is a two-dimensional (2D) surface or a three-dimensional (3D) volume divided into a series of contiguous grid cells or grid cubes. Each grid cell or grid cube is assigned a unique identifier and used for spatial indexing of the environment of the AV. Spatial indexing refers to storing and querying data in a data structure that represents objects defined in a geometric space, for example, the environment of the AV. One or more objects and free space in the environment of the AV are modeled as a collection of particles in the DOG, similar to how fluids are modeled in field theory-based fluid dynamics. The particles are instantiated as representations of the objects and free space. The particles are tracked by updating time-varying particle density functions across the DOG, and the updated particle density functions are used to determine probabilities of occupancy of the grid cells or grid cubes. The AV is operated in accordance with the probabilities of occupancy of the grid cells or grid cubes. For example, the AV can determine a time-to-collision (TTC) with respect to an object modeled in the DOG and perform a maneuver to avoid the collision.

The advantages and benefits of tracking objects and free space using the embodiments described include tracking the objects at a higher resolution with a reduced computational complexity, compared to traditional methods that track individual grid cells. For example, tracking the time-varying particle density functions described can be performed with a reduced computational burden because there is no need to account for individual particles within a given grid cell of the DOG. Because particles can be defined and tracked for free space, the disclosed embodiments allow for tracking of free-space, which improves the navigation capabilities of AVs. Moreover, through the selection of parameters that describe the velocities and forces of objects, occluded or partially visible objects can be tracked by analyzing the corresponding particle density functions.

System Overview

FIG. 1 is a block diagram illustrating an example of an autonomous vehicle 100 having autonomous capability, in accordance with one or more embodiments.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or"upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in an embodiment, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In an embodiment, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
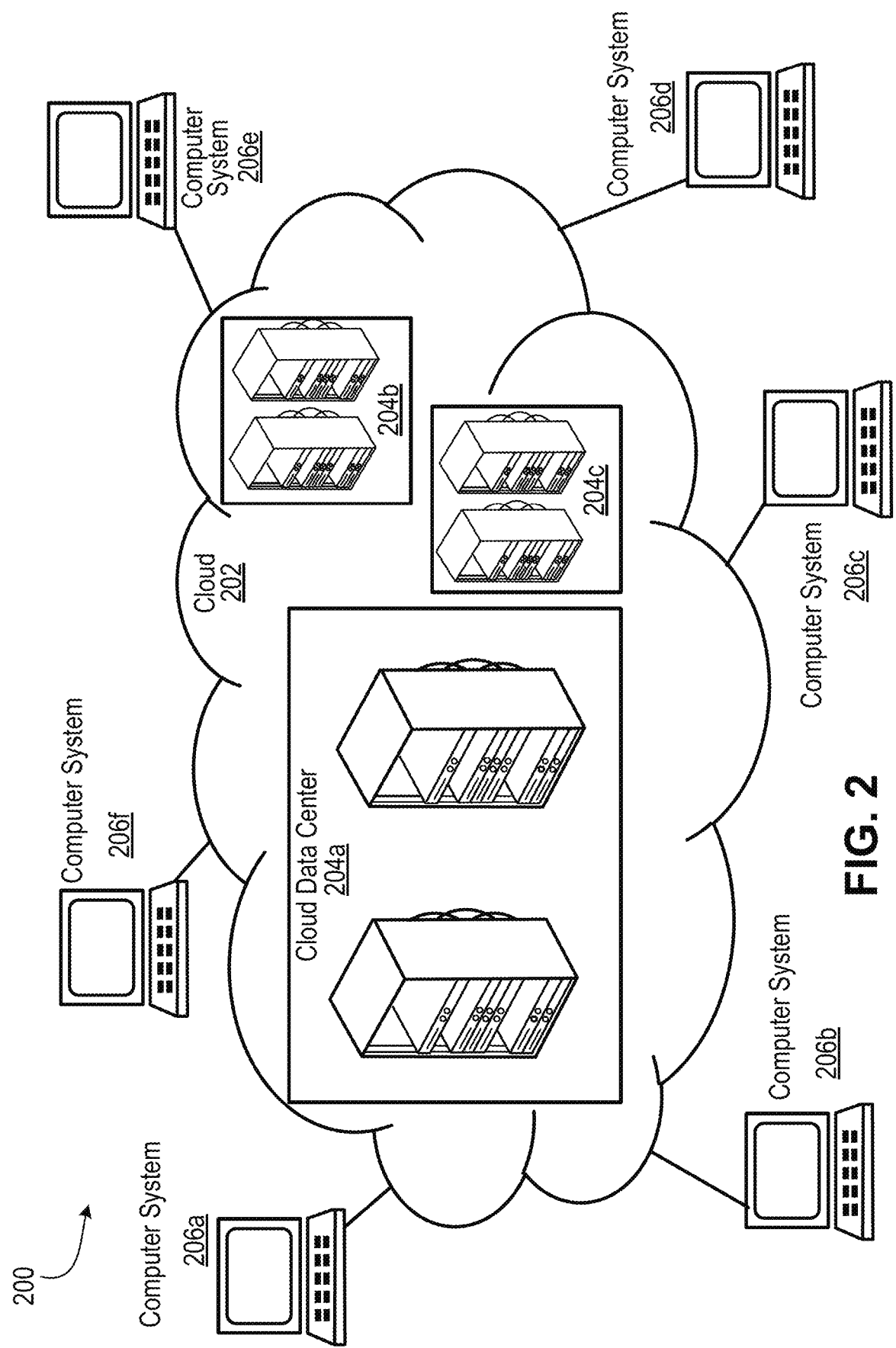
FIG. 2 is a block diagram illustrating an example "cloud" computing environment, in accordance with one or more embodiments.

FIG. 2 is a block diagram illustrating an example "cloud" computing environment, in accordance with one or more embodiments. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
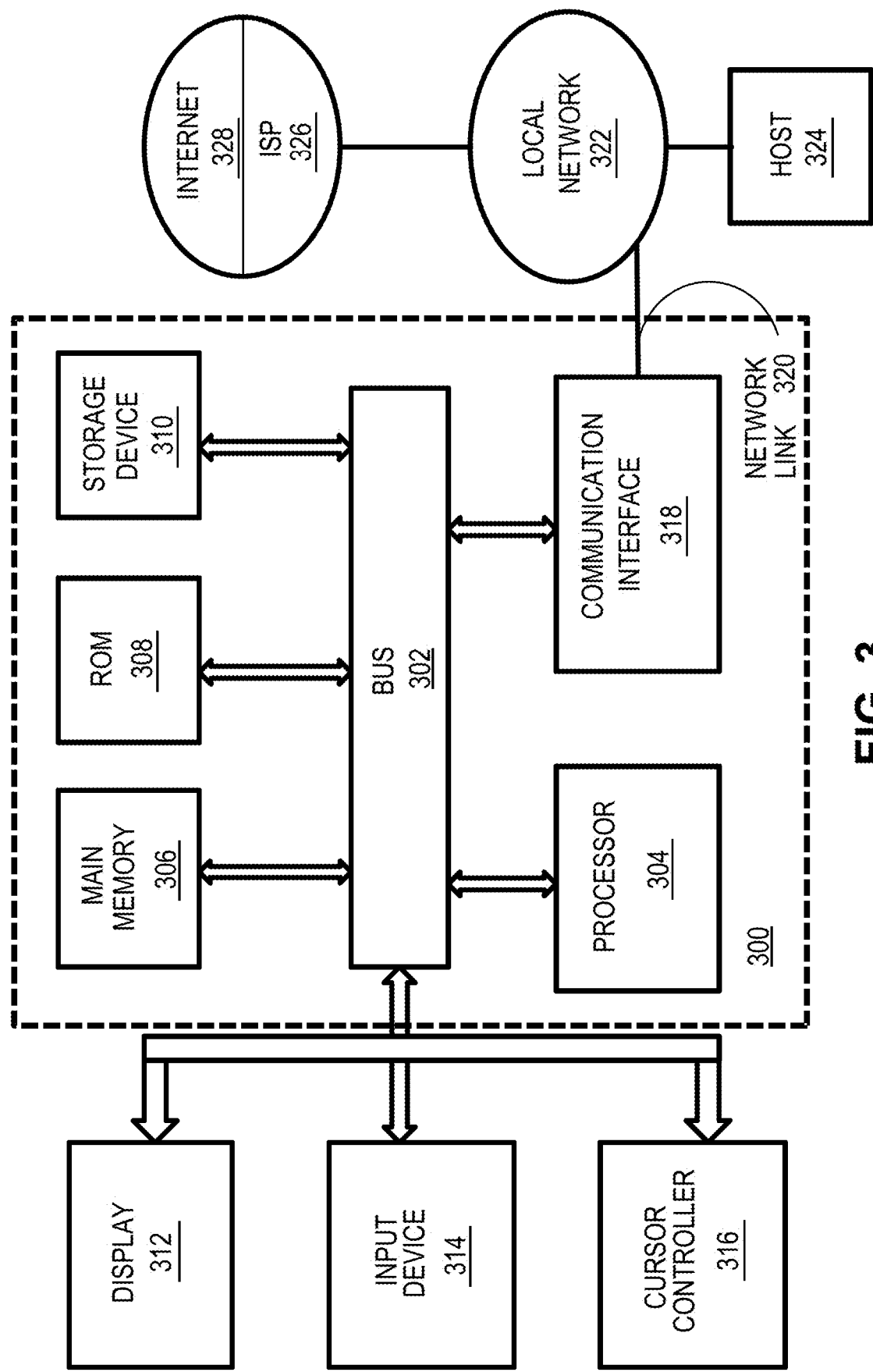
FIG. 3 is a block diagram illustrating a computer system, in accordance with one or more embodiments.

FIG. 3 is a block diagram illustrating a computer system 300, in accordance with one or more embodiments. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
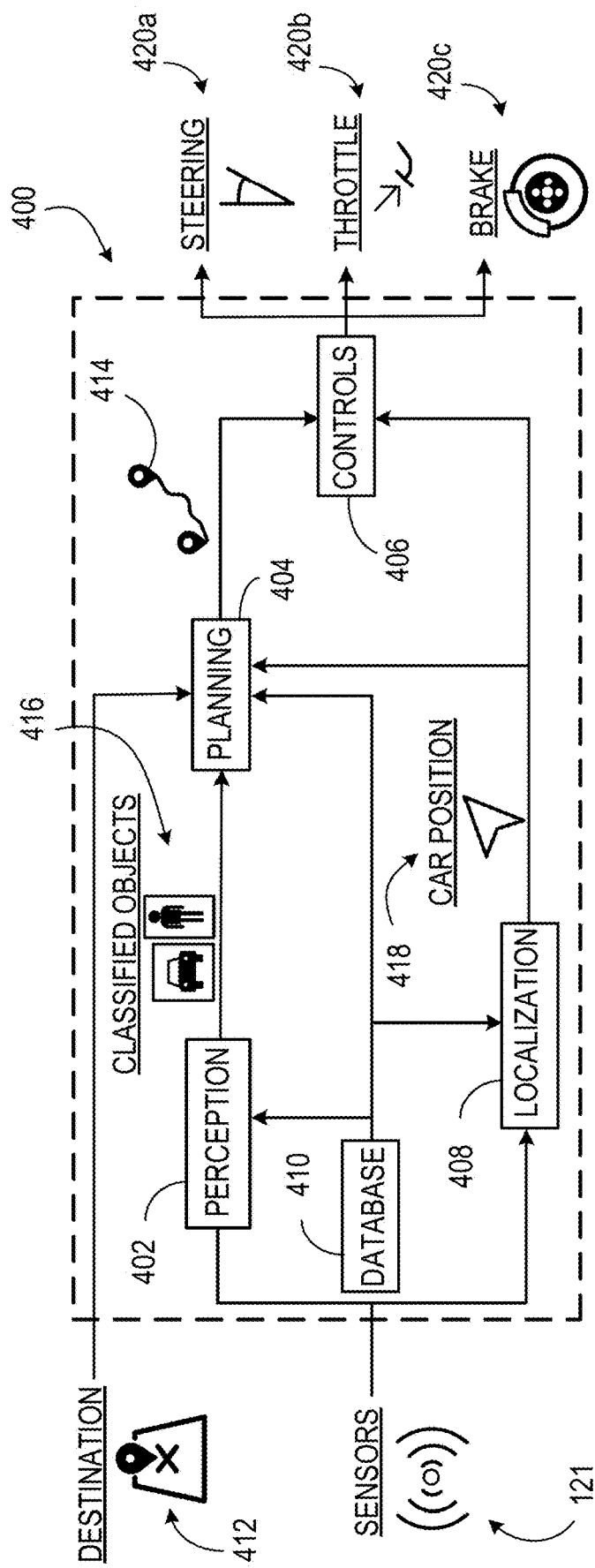
FIG. 4 is a block diagram illustrating an example architecture for an AV, in accordance with one or more embodiments.

FIG. 4 is a block diagram illustrating an example architecture 400 for an autonomous vehicle (e.g., the AV 100 shown in FIG. 1), in accordance with one or more embodiments. The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In an embodiment, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a global navigation satellite system (GNSS) unit and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
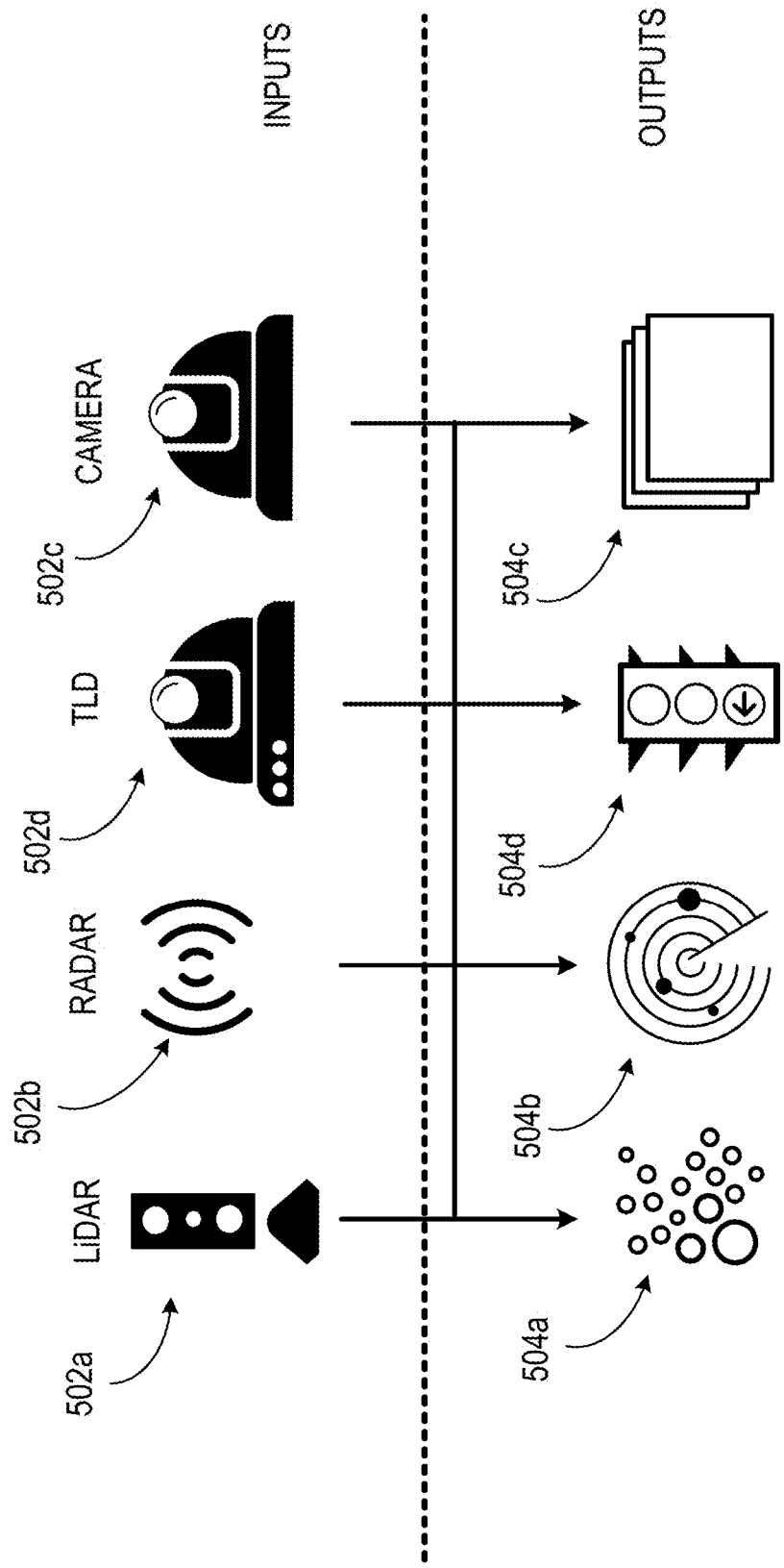
FIG. 5 is a block diagram illustrating an example of inputs and outputs that may be used by a perception module, in accordance with one or more embodiments.

FIG. 5 is a block diagram illustrating an example of inputs 502a-d (e.g., sensors 121 shown in FIG. 1) and outputs 504a-d (e.g., sensor data) that is used by the perception module 402 (FIG. 4), in accordance with one or more embodiments. One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual operation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In an embodiment, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In an embodiment, an early fusion technique is used. An early fusion technique is characterized by combining outputs before one or more data processing steps are applied to the combined output. In an embodiment, a late fusion technique is used. A late fusion technique is characterized by combining outputs after one or more data processing steps are applied to the individual outputs.

FIG. 6 is a block diagram illustrating an example of a LiDAR system 602 (e.g., the input 502a shown in FIG. 5), in accordance with one or more embodiments. The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
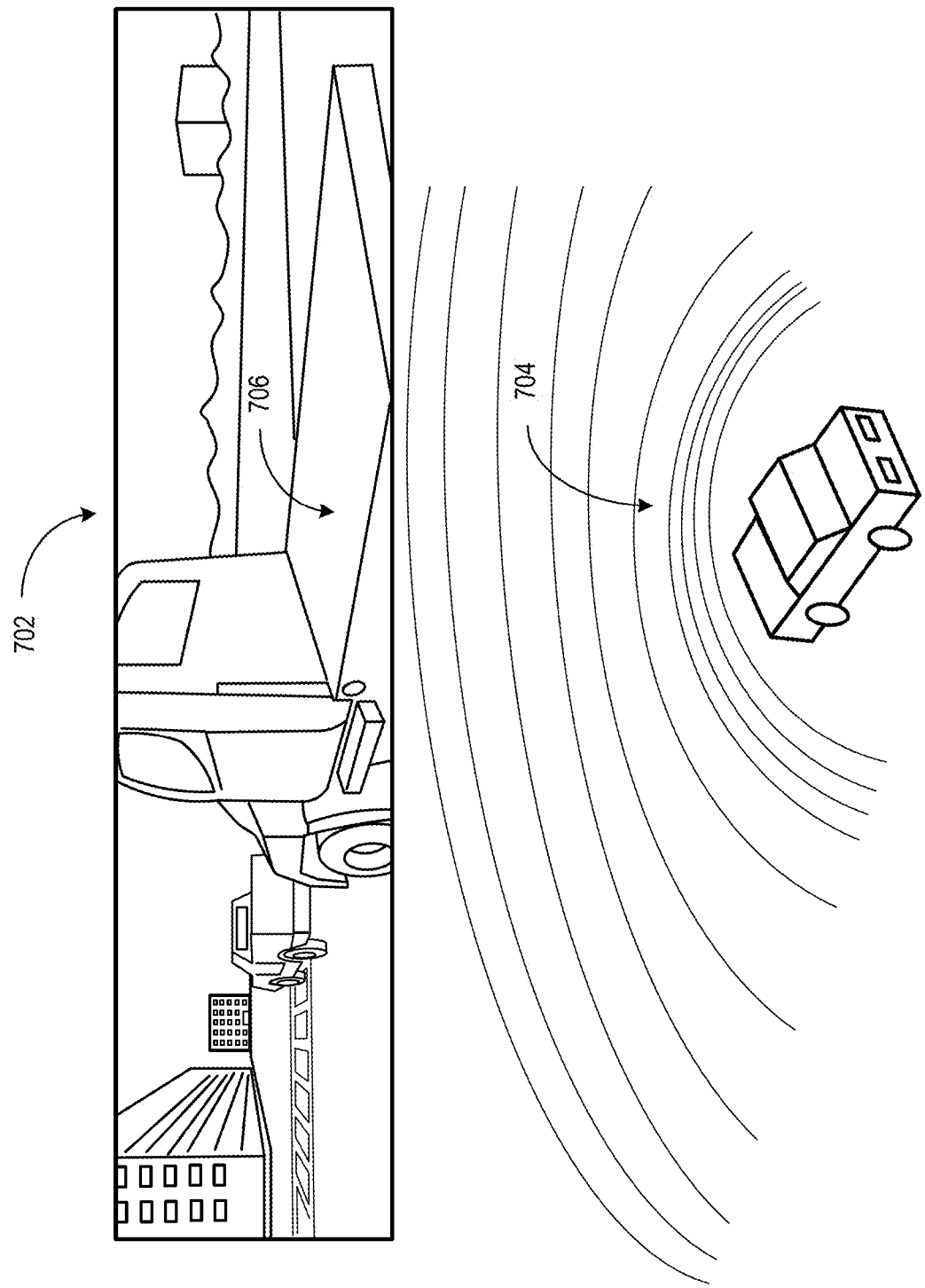
FIG. 7 is a block diagram illustrating the LiDAR system in operation, in accordance with one or more embodiments.

FIG. 7 is a block diagram illustrating the LiDAR system 602 in operation, in accordance with one or more embodiments. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
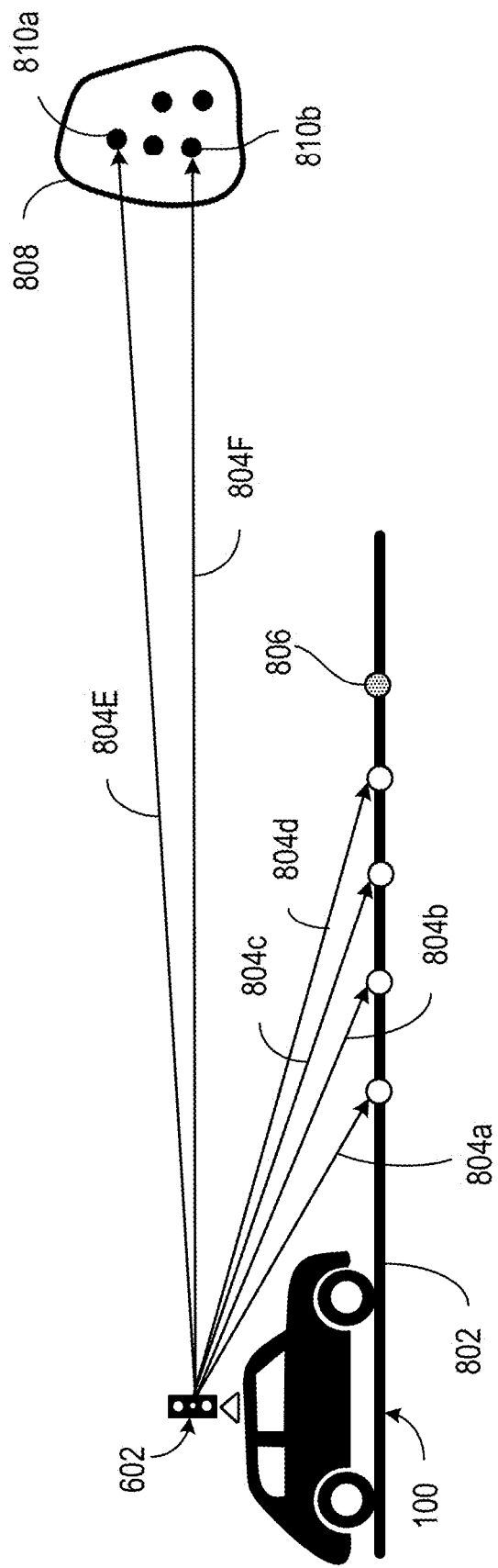
FIG. 8 is a block diagram illustrating the operation of the LiDAR system in additional detail, in accordance with one or more embodiments.

FIG. 8 is a block diagram illustrating the operation of the LiDAR system 602 in additional detail, in accordance with one or more embodiments. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
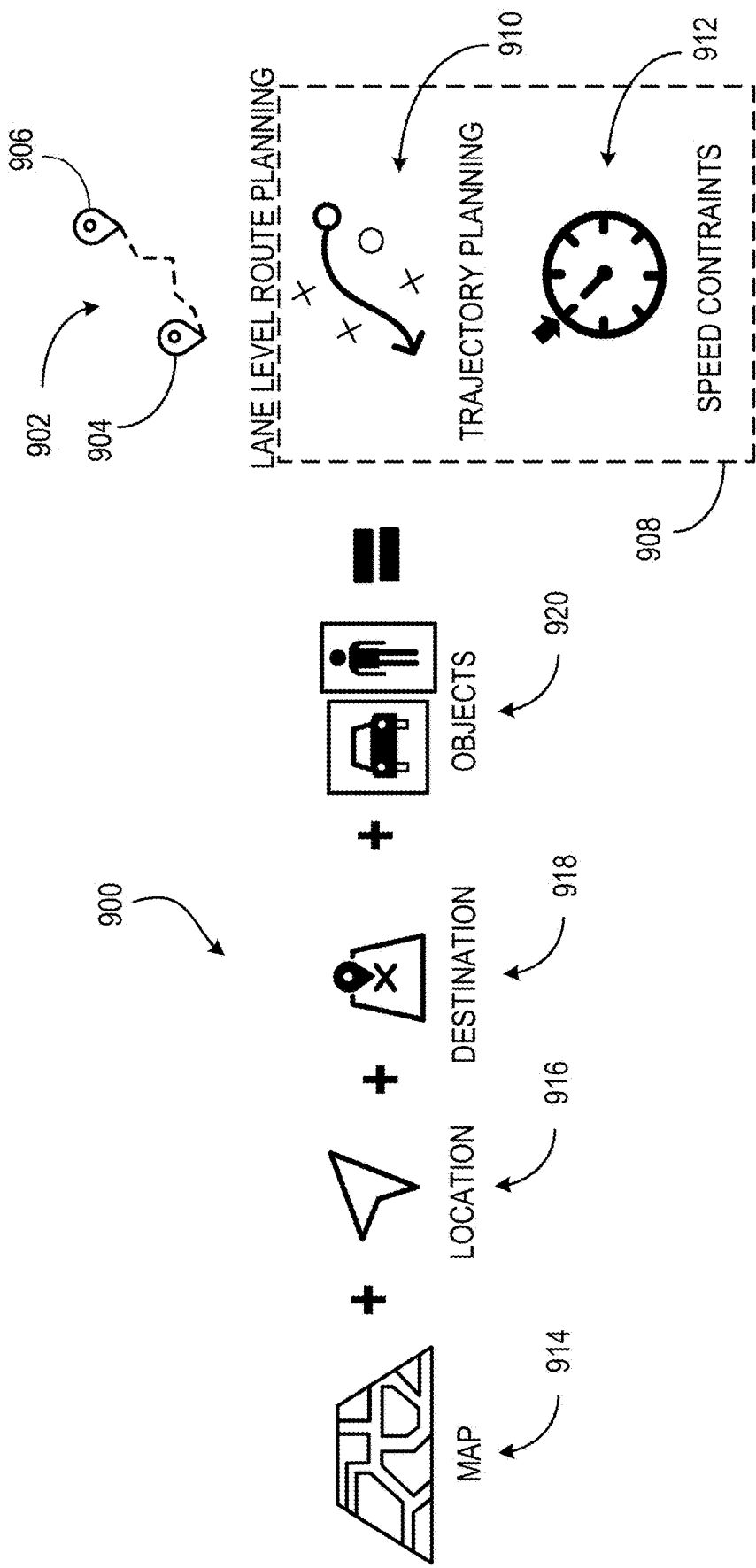
FIG. 9 is a block diagram illustrating the relationships between inputs and outputs of a planning module, in accordance with one or more embodiments.

FIG. 9 is a block diagram 900 illustrating of the relationships between inputs and outputs of a planning module 404 (e.g., as shown in FIG. 4), in accordance with one or more embodiments. In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In an embodiment, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
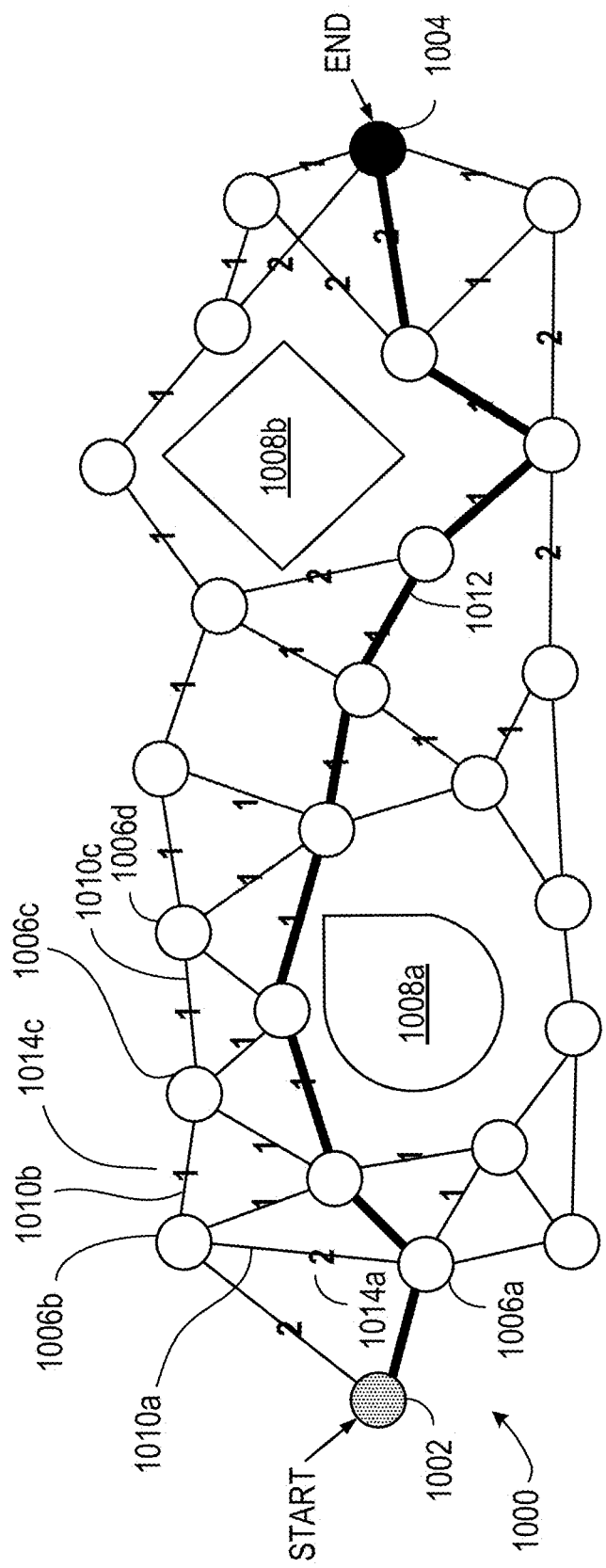
FIG. 10 illustrates a directed graph used in path planning, in accordance with one or more embodiments.

FIG. 10 illustrates a directed graph 1000 used in path planning, e.g., by the planning module 404 (FIG. 4), in accordance with one or more embodiments. In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
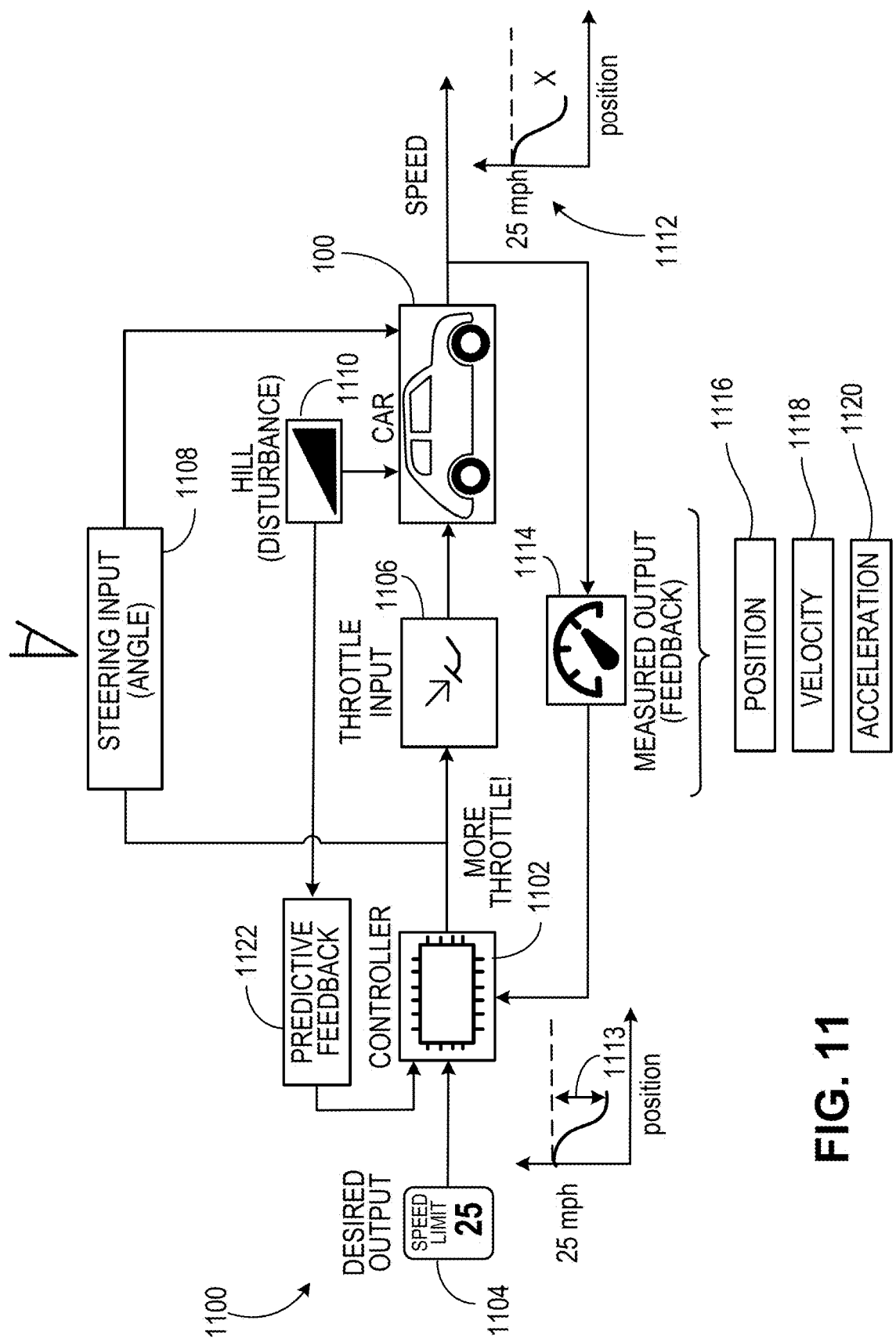
FIG. 11 is a block diagram illustrating the inputs and outputs of a control module, in accordance with one or more embodiments.

FIG. 11 is a block diagram 1100 illustrating the inputs and outputs of a control module 406 (e.g., as shown in FIG. 4), in accordance with one or more embodiments. A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
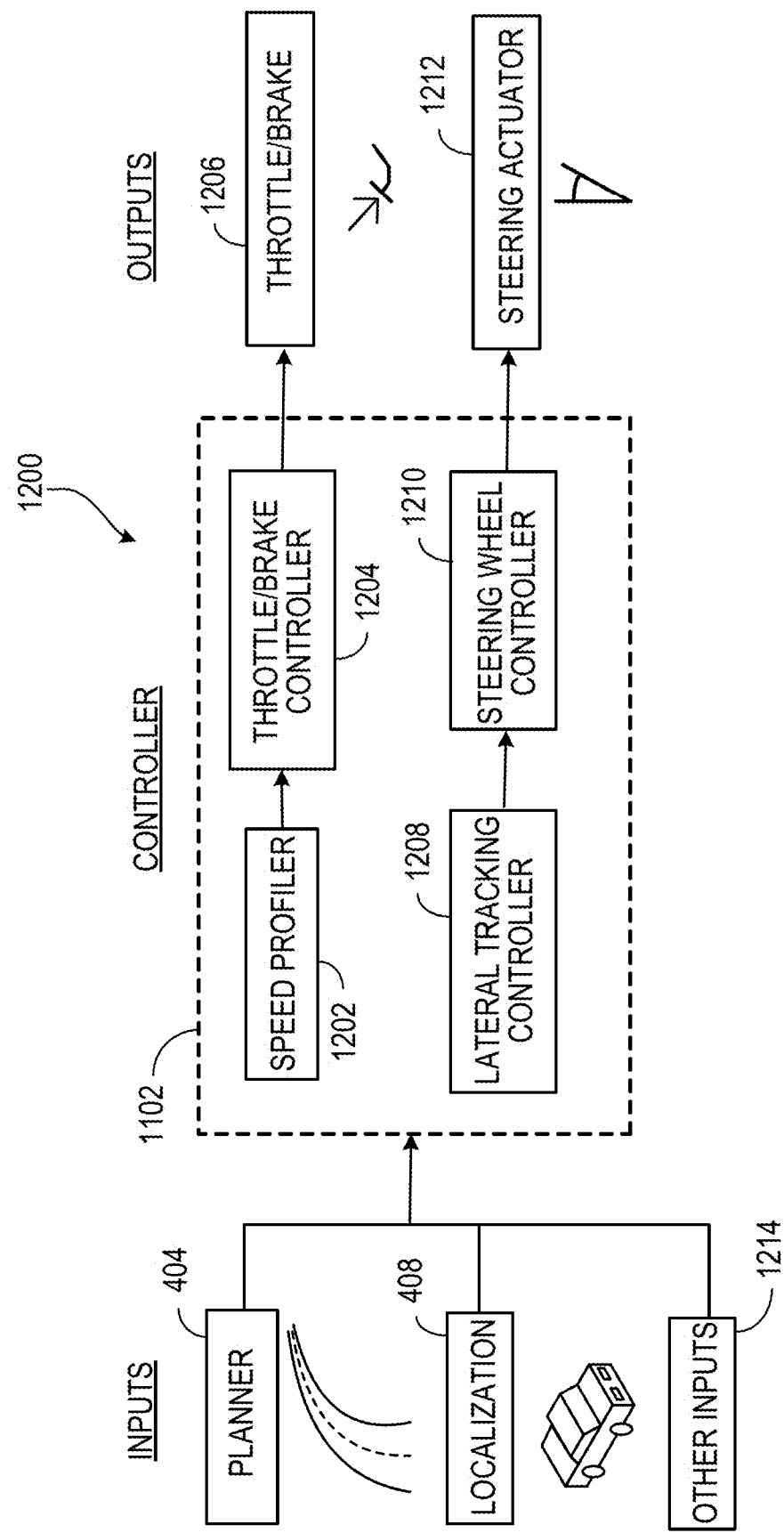
FIG. 12 is a block diagram illustrating the inputs, outputs, and components of a controller, in accordance with one or more embodiments.

FIG. 12 is a block diagram 1200 illustrating the inputs, outputs, and components of the controller 1102, in accordance with one or more embodiments. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Dynamic Occupancy Grid System

Figure 13:
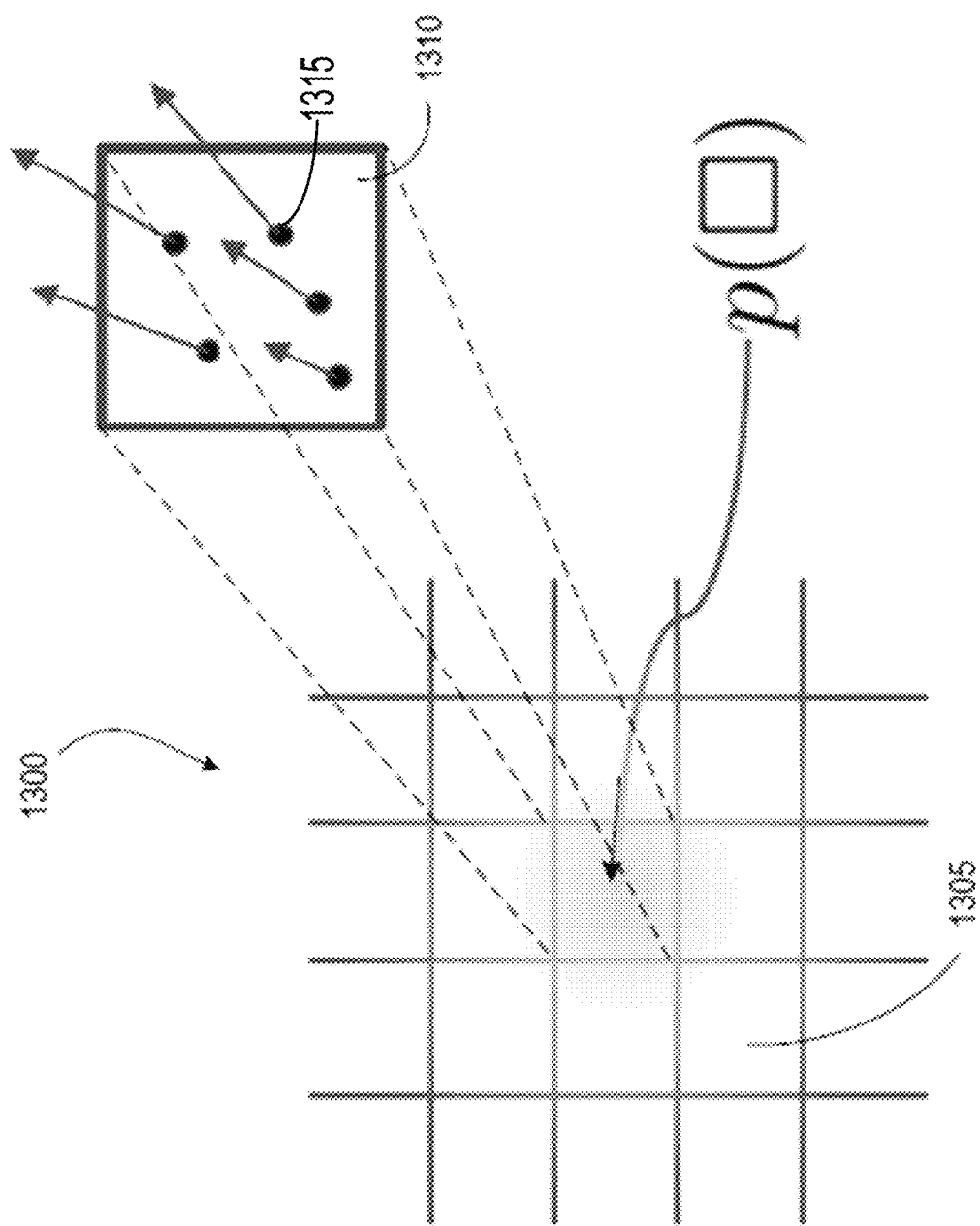
FIG. 13 is a block diagram illustrating a discretized representation of an environment of an autonomous vehicle, with particles representing an object or free space in a particular cell, in accordance with one or more embodiments.

FIG. 13 is a block diagram illustrating a discretized representation 1300 of an environment 190 of the AV 100. The environment 190 and AV 100 are illustrated and described in more detail with reference to FIG. 1. The discretized representation 1300 is referred to as a dynamic occupancy grid (DOG) 1300. In the DOG 1300, one or more particles represent an object 608 or free space in a particular grid cell or grid cube 1310. The object 608 is illustrated and described in more detail with reference to FIG. 6. For example, the grid cell or grid cube 1305 can represent free space (not occupied by an object).

The DOG 1300 includes a grid map with multiple individual grid cells 1305, 1310 (also referred to as grid cubes when the DOG 1300 is a three-dimensional (3D) grid). Each grid cell 1305, 1310 (grid cube) represents a unit area (or volume) of the environment 190. The DOG 1300 is generated, updated, and processed by a DOG circuit of the AV 100. In an embodiment, the DOG circuit is part of the perception module 402, illustrated and described in more detail with reference to FIG. 4. In another embodiment, the DOG circuit is part of a safety system (sometimes referred to as a RADAR and camera system) that is independent of the AV stack. The AV stack refers to the navigation system that includes the perception module 402 and planning module 404. In this embodiment, the DOG circuit performs collision prediction independently of the navigation system. The DOG circuit is built using the components illustrated and described in more detail with reference to FIG. 3.

In an embodiment, the DOG circuit is configured to update an occupancy probability of such individual grid cells 1305, 1310. The occupancy probabilities represent likelihoods of presence of one or more of the classified objects 608 in the individual grid cells 1305, 1310. An object 608 can be a natural obstruction 191, a vehicle 193, a pedestrian 192, or another object. The natural obstruction 191, a vehicle 193, and pedestrian 192 are illustrated and described in more detail with reference to FIG. 1. The occupancy state of each grid cell 1305 in the DOG 1300 can be computed, e.g., using a Bayesian filter to recursively combine new sensor measurements with a current estimate of a posterior probability for the corresponding grid cell 1305. Example sensors 121, 122, 123 are illustrated and described in more detail with reference to FIG. 1. The DOG 1300 is thus dynamically updated with time. The method assumes the environment 190 is dynamically changing, and the dynamics of the environment 190 is described by a Newtonian motion model. Therefore, the method estimates not only the occupancy, but also parameters of the dynamical model, such as, for example, velocities or forces.

The DOG 1300 divides the environment 190 of the AV 100 into a collection of individual grid cells 1305, 1310, and the probabilities of occupancy P1 of individual grid cells 1305, 1310 are computed. In some implementations, the cells 1305, 1310 are generated by dividing a semantic map (or a driving environment) based on a Cartesian grid, a polar coordinate system, a structured mesh, a block structured mesh, or an unstructured mesh. In some implementations, the cells 1305, 1310 are generated by regularly or irregularly sampling a semantic map (or a driving environment), e.g., by an unstructured mesh where the grid cells 1305, 1310 may be triangles, quadrilaterals, pentagons, hexagons, or any other polygon or a combination of various polygons for a 2D mesh. Similarly, the cell 1305 can be an irregular tetrahedron, a hexahedron, or any other polytope or a combination of polytopes for a 3-dimensional mesh.

In unstructured meshes the relation between the grid cells 1305, 1310 is determined by common vertices that the cells 1305, 1310 may share. For example, two triangles defined as two sets of vertex indices [a, b, c] and [b, c, e] share a common edge which is defined as a line segment between vertices b and c. In some implementations, the cells 1305, 1310 can be described by a dynamic occupancy graph, where each cell 1305 corresponds to a node and two adjacent cells are characterized by an edge on the dynamic occupancy graph. An example dynamic occupancy graph 1400 is illustrated and described in more detail with reference to FIG. 14. An edge may be assigned a value representing a dynamic interaction (described below) between the linked two nodes/cells. Each grid cell 1305 can be considered to be in one of two states—occupied or free.

Referring to FIG. 13, the probability of a given cell 1310 being empty is denoted as p($\square$). The states of the grid cells 1305, 1310 are updated based on sensor observations. This can be done, for example, using an inverse sensor model that assigns a discrete, binary occupancy probability $p_{z_{t+1}}(o_{t+1}|z_{t+1})$ to each grid cell based on a measurement $z_{t+1}$ at time $t+1$.

The dynamic state of grid cells 1305, 1310 can be addressed, for example, by modeling objects 608 such as vehicles 193 or pedestrians 192 as a collection of particles, akin to how fluid is modeled in field theory-based fluid dynamics. The term particles, as used herein, does not refer to physical units of matter. Rather, the particles represent a set of interacting software components, such that the software components together form a virtual representation of objects 608 (e.g., vehicles 193, pedestrians 192, etc.) and free space in the environment 190 of the AV 100. In some implementations, each software component is data that represents an instantiation of a unit of a conceptual object.

Referring again to FIG. 13, a magnified inset of the grid cell 1310 illustrates multiple particles 1315 representing the contents of the grid cell 1110. Each of the particles 1315 can be associated with one or more parameters that represent the state of the corresponding particle 1315. For example, the state of the particle 1315 can be represented by one or more of: a velocity (velocity along one or more of X direction, Y direction, Z direction), covariances associated with the multiple velocities, and a force acting on the particle 1315. Such parameters can account for various dynamic characteristics of the particles 1315. For example, a force parameter allows accounting for dynamics along a curved road or that of an accelerating vehicle.

In such field-theory based modeling, the number of particles 1315 in a particular grid cell 1310, or the sum of particle weights in a particular grid cell 1310 can represent a measure for the occupancy probability of the corresponding grid cell 1310. The technology described herein computes the probability of occupancy of the cells 1305, 1310 by tracking statistics of particle density functions. In other words, the states of the grid cells 1305, 1310 in this approach depend on one or more parameters of a joint distribution of the particles as they traverse the grid cells. An Eulerian solver or a Lagrangian solver can be used to determine the time-varying joint distributions by computing solutions to differential equations defined on the one or more particle-dynamics parameters obtained using one or more sensors 121, 122, 123. The resulting updated particle density functions are used in conjunction with forward sensor models associated with the corresponding sensors 121, 122, 123 to generate predictions on probability of occupancy of various grid cells.

As described above, the probability of a given cell 1310 being empty is denoted as p (D). In addition, the technology described herein assumes that for two disjoint volumes $\square_1$ and $\square_2$, the probabilities of their respective occupancies (or that of being empty) are uncorrelated. This can be represented as:

$$p(\square_1 \cup \square_2) = p(\square_1) p(\square_2) \quad (1)$$

From these assumptions, $-\log(p(\square))$ is defined an additive measure on the state space, and a density function $f(x)$ can be defined as being associated with the measure as follows:

$$p(\square) = \exp(-\int_\square f(x) dx) \quad (2)$$

This can be interpreted as the probability density function (sometimes referred to as a particle density function) of $\int_V f(x) dx$ number of identically distributed and independent particles inside a volume of the state space. Notably, because particles are considered to be identical, another inherent assumption of the technology described herein is that sensor measurements cannot be used to distinguish between particles. Rather, sensor measurements are defined as a probability of observation γ given a particle is located at x. This measurement can be referred to as a forward sensor model, and denoted as p(γ|x). Also, because sensor data cannot distinguish between particles and the measurements can be taken from only one particle, the probability of observation γ, given the entire volume V of a grid cell in the DOG 1300 is occupied (a situation that is denoted as ■, for visual aid purposes) can be denoted as:

$$p(\gamma|\blacksquare) = \int_V p(\gamma|x)dx \qquad (3)$$

For autonomous vehicle applications, the particles represent objects 608, free space etc., and are considered to be dynamic across the grid cells 1305, 1310 of the DOG 100. This is because the environment 190 for the AV 100 changes continuously, and the locations of particles with respect to the AV 100 vary with time. To account for the particle dynamics, the particle density function can be defined on a multi-dimensional phase space. For example, in some implementations, the particle density function can be defined as the function ƒ(t, x, v) in a time-space-velocity coordinate frame. This function can represent a probability density (sometimes referred to as particle density) of finding a particle at time t, at location x, and moving with velocity v. In some implementations, a probability density is empirically inferred from sensor data. In some implementations, a probability density modeled as a known probabilistic distribution (e.g., exponential family) or a mixture of two or more known probabilistic distributions. In some implementations, a probability density may not be modeled as a known distribution, but is purely characterized by sensor data.

In some implementations, other particle dynamic parameters such as a force acting on a particle, velocities along one or more additional directions, or covariances of multiple velocities can be used in the time-varying particle density functions. Because the particles are not stationary, the particle density function evolves over time, and the time-variation of the particle density function can be computed by determining solutions to a set of differential equations defined on the parameters that make up the particle density function. In some implementations, the evolution of the particle density function over time can be modeled using kinetic equations such as Boltzmann equations for the probability density function (sometimes referred to as a particle density function). For example, from fundamental principles of particle number conservation, the following differential equation can be defined:

$$\frac{d}{dt}f(t, x(t), v(t)) = \frac{\partial f}{\partial t} + \frac{\partial f}{\partial x}\dot{x} + \frac{\partial f}{\partial v}\dot{v} \equiv 0. \qquad (4)$$

By evaluating time derivative of positions and velocity, a Boltzmann partial differential equation can be derived as follows:

$$\frac{\partial f}{\partial t} + v\frac{\partial f}{\partial x} + a\frac{\partial f}{\partial v} = 0 \qquad (5)$$

The dynamics described in the above equations is based on a Cartesian coordinate system, but it may be generalized on any coordinate systems. In some implementations, when describing the cells and their interactions by a graph, a gradient operator on the graph can be used to capture the Boltzmann equations. To reduce the computational complexity for real-time AV applications, the technology described herein uses an Eulerian solver that computes the solutions to the differential equation using numerical approximation. The Eulerian solver operates by approximating the differential equation as an ordinary differential equation (ODE) with known initial values of a set of parameters, and uses a forward Euler method to predict the values of the parameters at a future time point.

In an embodiment, the DOG circuit determines the particle density function at a particular time point $t_n$. This can be done, for example, using sensor data received from the one or more sensors 121, 122, 123. In some implementations, the sensor data can include RADAR and/or LiDAR data 504a having information on one or more parameters pertaining to the particles. The LiDAR data 504a is illustrated and described in more detail with reference to FIG. 5. For example, the parameters can include one or more of a velocity of a particle 1315 along a particular direction as defined in accordance with a coordinate system governing the discretized representation of the environment 190, a force acting on a particle 1315, or a location of a particle 1315. In some implementations, the DOG circuit determines one or more additional parameters based on the information received from the sensors 121, 122, 123. For example, if information on velocities along multiple directions (e.g., an X direction and Y direction, and possibly also a Z direction, as defined in accordance with a Cartesian coordinate system) is received from the sensors 121, 122, 123, the DOG circuit determines covariances of such velocities.

In some implementations, when the received sensor information includes velocity information along X and Y directions, the DOG circuit generates an observation vector γ that includes the following parameters associated with particle dynamics: the density p of particles in a grid cell, velocity components $v_x$ and $v_y$, along x and y directions, respectively, and the corresponding covariances $\sigma_{xx}$, $\sigma_{xy}$, and $\sigma_{yy}$. The covariance terms are used to account for uncertainties in the velocity terms. For notational purposes, the particle density function is represented in this document as ƒ(t, x, v), ƒ(t, x(t), v(t)), as denoted above, or ƒ(t, x, y, v) for two-dimensional DOGS. In an embodiment, a polar coordinate system may be used, and the notation of the density distribution becomes ƒ(t, r, v), where r is the radius of location (x, y).

The observation can then be provided to an Eulerian solver or a Lagrangian solver to determine solutions to differential equations defined on the one or more parameters. The Eulerian solver can include one or more processing devices that are programmed to compute a numerical solution to the differential equations using forward Euler methods. This can include predicting the variations in the different parameters for a future time point $t_{n+1}$. The Eulerian solver approach reduces the computational complexity compared to traditional processes and generate images with higher quality (e.g., resolution) and dynamic range.

The Eulerian solver predicts the evolution of the various parameters of the particles and provides such predicted values to the DOG circuit for time point $t_{n+1}$. The DOG circuit calculates the predicted distribution of the particle density function, and generates an updated version of the particle density function ƒ(t, x, y, v). For notational ease though, the particle density function may also represented in this document as ƒ(t, x, v). The particle density function calculated by the DOG circuit can be provided via a feedback loop to the DOG circuit to update the prior distribution.

The DOG circuit also determines the likelihood of a particle location being occupied at the future time point $t_{n+1}$, given the current observation vector γ (also referred to as the probability of observation, γ). This is calculated as:

$$p(\bullet_{x,y} \mid \Upsilon) = \frac{p(\gamma \mid \bullet_{x,y})}{p(\gamma \mid \circ_{x,y})} \cdot f(t, x, y, v) \quad (6)$$

Here, the term $$\frac{p(\gamma \mid \bullet_{x,y})}{p(\gamma \mid \circ_{x,y})}$$

represents a forward sensor model and represents the probability of observation γ given that point (x, y) is occupied by an object with velocity v. The forward sensor models for various sensor modalities (e.g., LiDAR, RADAR, vision, and other sensor modalities) can be computed from annotated ground-truth data. The ground truth data can be collected, for example, by collecting the statistics of observations and occupancy information considering both as independent random samples. Such forward sensor models are used by the DOG circuit to condition the joint distribution of the parameters with respect to occupancy. In some implementations, the measurements and occupancy information are drawn from substantially continuous distributions. Such continuous distributions can be approximated by recording histograms by placing observation samples into appropriately spaced bins, and fitting an analytic density function to the discrete histogram.

In some implementations, forward sensor models can also be configured to detect fault conditions in the sensors 121, 122, 123. For example, the ground truth data obtained from such models can be used to determine if the received sensor data is outside a range of expected values for that particular sensor by a threshold amount, and/or if the received data is inconsistent with data received for other sensors. If the sensor data from a particular sensor is determined to be out of the range by the threshold amount, a fault condition may be determined/flagged for that sensor, and the corresponding sensor inputs may be ignored until resolution of the fault condition.

The output generated by the DOG circuit is therefore a Bayesian estimate for the particle density function $f(t, x, y, v)$. In this function, $t \in \mathbb{R}_0^+$, represents time, (x, y) represents the location in a two-dimensional space W, and $v \in \mathbb{R}^2$ is the velocity vector at (x, y). This output may be queried in various ways across the DOG 1300. For example, a form of a query is to compute an expected number of particles in a region of phase space plus time:

$$(\Omega \subset \mathbb{R}_0^+ \times W \times \mathbb{R}^2) \quad (7)$$

In some implementations, this can be computed as:

$$\mathbb{E}[N] = \int_\Omega f(t,x,v) dt dx dv \quad (8)$$

Under the assumptions that particles are distributed identically and independently and the number of particles is very large, this yields that the probability of the region of phase space plus time being empty is given by:

$$P(\text{empty}(\Omega)) = \exp(-\mathbb{E}[N]) = \exp(-\int_\Omega f(t,x,v) dt dx dv) \quad (9)$$

The technology described herein can therefore be used in tracking not just objects 608, but also free space. The planning module 404 of the AV 100 uses this information to determine where the AV 100 can be steered to. The planning module 404 is illustrated and described in more detail with reference to FIG. 4. In some implementations, this information, possibly in conjunction with the information on the objects 608 that the AV 100 must steer away from, can improve the control of the AV 100, for example, by providing multiple possibilities.

In some implementations, one or more additional quantities can be defined to obtain more information from the particle density function. For example, for a set of points $\{p_i\}_{i=0}^n$, a closed polygon can be defined as a set of points in the world W such that a ray originating at any of this points intersects an odd number of segments:

$$\{[p_i, p_{(i+1) \bmod n}]\}_{i=0}^{n-1} \quad (10)$$

This polygon can be denoted as P. In some implementations, a polygon can represent a grid cell of a discretized representation of an AV environment 190. However, notably, because the definition of the polygon is not dependent on any particular grid, the technology described herein can be implemented in a grid-agnostic manner. Further, it may be useful in some cases to define a conditional distribution $f(t_0, x, v)$ representing the particle density function at a specific point in time, an unconditional distribution $\rho(t, x) = \int_{\mathbb{R}^2} f(t, x, v)$ that represents the particle density function in space and time regardless of their velocities, and a combination of both. Such quantities can be used to determine various quantities of interest for the operation of the AV 100. For example, the probability of a polygon P being occupied at a particular time to can be computed as:

$$1 - \exp(-\int_P \rho(t_0, x) dx) \quad (11);$$

When considering multiple velocities (e.g., velocities along different directions), this can be extended, by defining another polygon $P_v$ in the vector space of velocities. Under this extension the probability of an object 608 occupying a polygon $P_x$ and travelling with a velocity from P, is given by:

$$1 - \exp(-\int_{P_x \times P_v} f(t_0, x, v) dx dv). \quad (12)$$

In another example, various other probabilities, such as the probabilities of a space being occupied during a time interval can be computed using the particle density functions described above. Such probabilities, together with labeling on the particles can be used to identify various classified objects 608 including inanimate objects, persons, and free space, and how they move over time through the discretized representation of AV environment 190.

Prior to tracking the particle density functions over the DOG 1300, the DOG circuit can define and label particles (pedestrians 192, vehicles 193, or free space), and assign an initial probability to individual grid cells. In some implementations, each cell is initially assumed to be occupied (e.g., via an assignment of a high probability of occupancy), and later updated based on sensor data. In some implementations, particles can be assigned different colors based on whether they represent objects 608 (with additional color coding to differentiate between vehicles 193 or pedestrians 192) or free space. In some implementations, particles can be defined, labeled, and updated as interactive software components such as described in the document, Nuss et. al, "A Random Finite Set Approach for Dynamic Occupancy Grid Maps with Real-Time Application," International Journal of Robotics Research, Volume: 37 issue: 8, page(s): 841-866—the contents of which are incorporated herein by reference.

In an embodiment, the DOG circuit receives LiDAR data 504*a* from one or more LiDARs 502*a* of the AV 100. The LiDAR data 504*a* and LiDAR 502*a* are illustrated and described in more detail with reference to FIG. 5. The LiDAR data 504*a* represents one or more objects 608 located in the environment 190. The DOG circuit generates the DOG 1300 based on a semantic map of the environment 190. The DOG 1300 includes multiple grid cells 1305, 1310. Each grid cell 1310 represents a portion of the environment 190. In an embodiment, each grid cell 1310 is one of a two-dimensional polygon or a three-dimensional polyhedron. In an embodiment, a length of each edge of the grid cell 1310 is in a range from 1 cm to 1 m. Each 2D grid cell or 3D grid cube is tracked on a centimeter to meter level, such that computation complexity is not exceeded.

In an embodiment, generating the DOG 1300 includes segregating a semantic map of the environment 190 into the grid cells 1305, 1310 based on the Cartesian coordinate system. For example, 3D grid cubes are generated by dividing a map (or a driving environment) based on a Cartesian coordinate system or a polar coordinate system. In an embodiment, generating the DOG 1300 includes segregating the semantic map of the environment 190 into the grid cells 1305, 1310 based on the polar coordinate system. In an embodiment, the DOG 1300 is generated based on regular sampling of the semantic map of the environment 190. For example, the 3D grid cubes are generated by regularly or irregularly sampling a map or a driving environment. In an embodiment, the DOG 1300 is generated based on irregular sampling of the semantic map of the environment 190.

The classified objects 608, as perceived by the perception module 402, are positioned on the DOG 1300. The DOG 1300 can include a grid map with multiple individual cubes that each represents a unit volume of the environment 190. In an embodiment, generating the DOG 1300 includes allocating a portion of the LiDAR data 504*a* to more than one grid cell 1310. The portion of the LiDAR data 504*a* corresponds to a particular object, say vehicle 193. Each object is typically larger than a single grid cube and is distributed over more than one grid cube.

For each grid cell 1310, the DOG circuit generates a probability density function (sometimes referred to as a particle density function) based on the LiDAR data 504*a*. The probability density function represents a probability P1 that the portion of the environment 190 represented by the grid cell 1310 is occupied by the particular object (vehicle 193). The LiDAR point cloud data 504*a* is thus received and distributed over the grid cells 1305, 1310. The vehicle 193 is tracked (in the form of a probability density function) as the received LiDAR data 504*a* moves between the grid cells 1305, 1310 over time. The probability density function can further represent a probability P0 that the grid cell 1310 is free of the vehicle 193.

In an embodiment, the DOG circuit updates the DOG 1300 using recursive Bayesian analysis on the LiDAR data 504*a* over time. The DOG circuit thus continuously or periodically updates occupancy probabilities, P0 and P1, for each 3D grid cube 1310 (or 2D grid cell) based on LiDAR returns. Pre-computed template waveforms generated using historical LiDAR data can be stored and compared to observed DOG waveforms to determine characteristics of the environment 190 that the AV 100 is navigating, as illustrated and described in more detail with reference to FIGS. 15 and 16.

In an embodiment, generating the probability density function includes: responsive to determining that an intensity of a portion of the LiDAR data 504*a* (LiDAR signal intensity) corresponding to the vehicle 193 is greater than a threshold intensity, identifying the grid cell 1310 representing the portion of the environment 190. In an embodiment, generating the probability density function further includes comprises adjusting the probability P1 that the portion of the environment 190 is occupied by the vehicle 193 to greater than zero. When a single LiDAR return is received having intensity above a threshold intensity, the corresponding grid cube 1310 is identified and set to a value, "occupied". The LiDAR signal intensity can be measured in units of power or optical power, such as Watts or Joules. In an embodiments, the LiDAR signal intensity is normalized by time (e.g., per second) or by space (e.g., per cm 2). In another embodiment, units are not used because the DOG circuit analyzes the relative LiDAR signal levels with respect to noise (corresponding to empty space) or normalizes the LiDAR intensity distribution as a probability density function.

In an embodiment, the probability density function further represents a conditional probability B2 that a portion of the environment 190 represented by a grid cell (e.g., grid cell 1305) will remain occupied by the vehicle 193, given that the portion of the environment 190 represented by the grid cell 1305 is occupied by the vehicle 193. In an embodiment, the probability density function further represents a conditional probability B1 that the portion of the environment 190 represented by the grid cell 1305 will remain free of the vehicle 193, given that the portion of the environment 193 represented by the grid cell 1305 is free of the vehicle 193. Thus, if a grid cube 1305 is free of objects, the probability it will remain free is B1. The probability it will be occupied is 1-B1. Similarly if a grid cube 1305 is occupied, the probability it will remained occupied is B2.

In an embodiment, the probability that the portion of the environment 190 represented by the grid cell 1310 is occupied by the vehicle 193 is denoted by P1. The DOG circuit generates a second probability density function based on the LiDAR data 504*a*. The second probability density function represents a second probability p2 that the portion of the environment 190 represented by the grid cell 1310 is occupied by a pedestrian 192. The one or more objects 608 include the pedestrian 192. Each grid cell 1310 can thus have a different probability distribution for pedestrians 192, vehicles 193, or other objects. In an embodiment, the LiDAR data 504*a* includes noise. The DOG circuit determines that the probability P1 for a particular grid cell 1310 is greater than zero. The DOG circuit determines that the probability P1 for neighboring grid cells of the particular grid cell 1310 is zero. The LiDAR data 504*a* can thus include noise that forms part of the DOG 1300. Thus, one cell 1310 can be occupied while others around it are free. If nothing is in the surrounding cubes, the occupied cube is set to free to filter the noise out. In an embodiment, the LiDAR data 504*a* includes noise. The DOG circuit adjusts the probability P1 for the particular grid cell 1310 to zero.

In an embodiment, generating the probability density function includes transforming the LiDAR data 504*a* into the probability P1 that the portion of the environment 190 represented by the grid cell 1310 is occupied by the vehicle 193 using a Fourier transform. The LiDAR data 504*a* is measured in the time domain and the grid cells 1305, 1310 are generated in the space domain. The Fourier transform is used to convert the time-domain LiDAR data 504*a* to the space domain (DOG 1300)). In an embodiment, generating the probability density function includes recursively combining the LiDAR data 504*a* with a posterior probability that the portion of the environment 190 represented by the grid cell 1310 is occupied by the vehicle 193 using a Bayesian filter. The occupancy state of each grid cell 1310 is computed using a Bayesian filter to recursively combine new LiDAR measurements with the current estimate of the posterior probability of the grid cell 1310.

The DOG circuit determines that a time-to-collision (TTC) of the AV 100 and the vehicle 193 is less than a threshold time based on the probability density function. Responsive to determining that the TTC is less than the threshold time, the control module 406 operates the AV 100 to avoid a collision of the AV 100 and the vehicle 193. The control module 406 is illustrated and described in more detail with reference to FIG. 4.

In an embodiment, the DOG circuit receives sensor data from one or more sensors 121, 122, 123 of the AV 100. The sensor data has an associated latency from the time of capture (that can be encoded into the data) as it is transmitted from the sensors 121, 122, 123 to the DOG circuit (optionally through the perception module 402). Responsive to determining that the latency is less than a threshold latency, the DOG circuit executes a cyclic redundancy check on the sensor data. For example, the DOG circuit checks the quality of the sensor data signals, such as timing (e.g., latency) of the path data or a protocol of the path data. The path data refers to sensor data describing the physical path the AV 100 is traversing. If the DOG circuit determines that the sensor data is of poor quality, the DOG circuit can send a "failed sensor data" signal to an arbiter module of a safety system or to the AV stack (AV navigation system).

In an embodiment, the DOG 1300 includes multiple particles. Each particle has a state. In an embodiment, the state includes a first velocity of the particle in an X direction, a second velocity of the particle in a Y direction, and a third velocity of the particle in a Z direction. For example, each of the particles in the DOG 1300 is associated with parameters that represent the state of the corresponding particle. The state of the particle can be represented by one or more of a velocity along one or more of an X direction, a Y direction, or a Z direction. In an embodiment, the state further includes a covariance associated with the first velocity, the second velocity, and the third velocity. In an embodiment, the state further includes a force acting on the particle. Such parameters can account for various dynamic characteristics of the particles. In an embodiment, the force represents a motion of the AV 100 along a curved road. For example, a force parameter allows accounting for dynamics along a curved road or that of an accelerating AV 100. In an embodiment, the force represents an acceleration of the AV 100.

Responsive to determining that the sensor data passes the cyclic redundancy check, the DOG circuit determines a discrete, binary (0 or 1) occupancy probability for each grid cell 1305, 1310 using an inverse sensor model of the one or more sensors 121, 122, 123 based on the sensor data. The binary occupancy probability denotes whether a portion of the environment 190 in which the AV 100 is operating is occupied by an object 608. The inverse sensor model assigns a discrete, binary occupancy probability to each grid cell 1305, 1310 based on a measurement at time t. In an embodiment, responsive to determining the occupancy probability of each grid cell 1305, 1310, the DOG circuit determines a motion of the object 608 based on a change in the occupancy probability. For example, if a grid cell 1305, 1310 represents an occupied portion of the environment 190, it will have a stronger LiDAR signal associated with the grid cell 1305, 1310. If the grid cell 1305, 1310 (portion of the environment 190) is not occupied, it will have a weaker LiDAR signal, mainly noise. Thus, the DOG circuit not only determines whether the grid cell 1305, 1310 is occupied, but also infers movement of the occupying object 608. First, the DOG circuit determines whether the portion of the environment 190 is occupied, then it infers motion.

The DOG circuit determines the occupied cell rate (0 or 1) and a confidence. In an embodiment, the DOG circuit determines an occupancy confidence corresponding to the occupancy probability for each grid cell 1305, 1310 of the DOG 1300. In an embodiment, the occupancy confidence is determined based on at least one of a maturity, a flicker, a LiDAR return intensity, or fusion metrics of the sensor data. For example, a collision warning or brake deceleration is triggered based upon a confidence higher than a (calibratible) threshold that includes factors such as maturity, flicker, return intensity, and other fusion metrics. In an embodiment, transmitting the deceleration request is responsive to the occupancy confidence being greater than a threshold occupancy confidence.

The DOG circuit determines a particle density function based on the occupancy probability using a kinetic function. For example, the DOG circuit determines the cube occupancy cumulative distribution function. Evolution of the particle density function over time can be modeled using kinetic equations such as Boltzmann equations for the probability density function. In an embodiment, the particle density function is determined across a multi-dimensional phase space. In an embodiment, the particle density function is determined in a time-space-velocity coordinate frame. This function can represent a probability density of finding a particle at time t, at location 1, and moving with velocity v.

Responsive to determining that the particle density function indicates that a TTC between the AV 100 and the object 608 is less than a threshold TTC, the DOG circuit transmits a deceleration request to a control circuit 406 of the AV 100. For example, the DOG circuit calculates an associated TTC distribution using a constant velocity model. The DOG circuit calculates a mean TTC and a minimum TTC at a threshold confidence level. The DOG circuit determines whether to command a collision warning and a brake deceleration based on the TTC. Upon detecting a collision threat, the DOG circuit transmits a deceleration request based upon the cell occupancy probability, for example, trigger based upon a probability greater than a (calibratible) threshold probability. In an embodiment, a deceleration of the deceleration request increases as the TTC decreases. For example, the deceleration requests are greater for shorter TTCs. In an embodiment, a deceleration of the deceleration request increases as a speed of the AV 100 increases. For example, the deceleration requests are to be greater for greater AV 100 speeds.

Figure 14A:
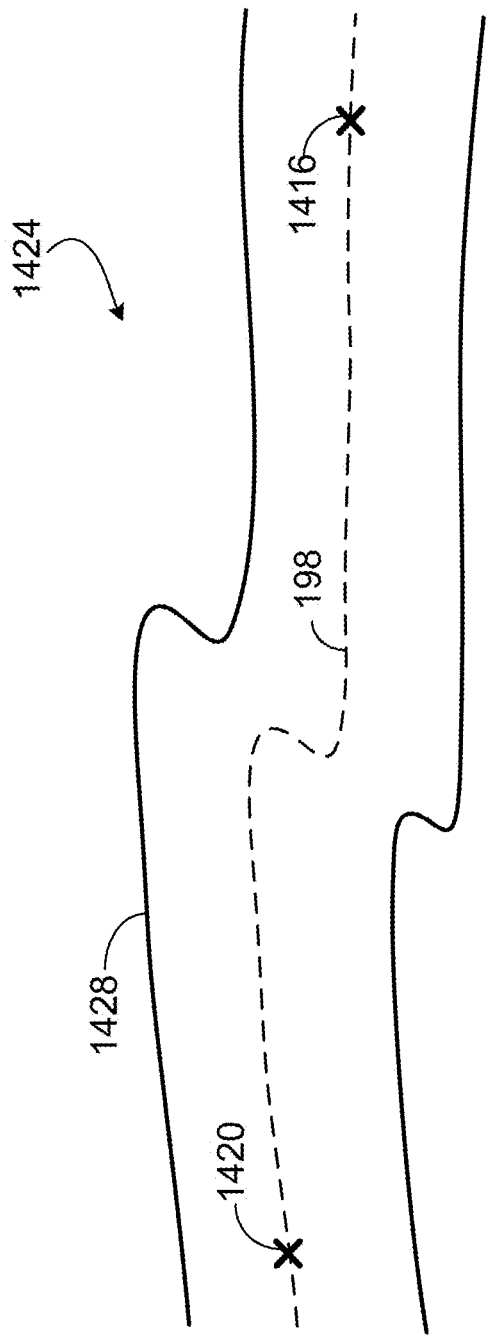
FIG. 14A illustrates a drivable area, in accordance with one or more embodiments.

FIG. 14A illustrates a drivable area 1424, in accordance with one or more embodiments. The drivable area 1424 includes a road 1428 along which the AV 100 can operate. The AV 100 is illustrated and described in more detail with reference to FIG. 1. There are two adjacent spatiotemporal locations 1420, 1416 shown on the road 1428 in FIG. 14A. For example, the AV 100 can drive from spatiotemporal location 1420 to spatiotemporal location 1416. A trajectory 198 connects spatiotemporal location 1420 to adjacent spatiotemporal location 1416. The trajectory 198 is illustrated and described in more detail with reference to FIG. 1.

FIG. 14B is a block diagram illustrating a dynamic occupancy graph 1400, in accordance with one or more embodiments. The DOG circuit generates a dynamic occupancy graph 1400 (instead of the DOG 1300) representing the drivable area 1424 along the trajectory 198 of the AV 100. The DOG 1300 is illustrated and described in more detail with reference to FIG. 13. The trajectory 198 and AV 100 are illustrated and described in more detail with reference to FIG. 1. The drivable area 1424 is illustrated and described in more detail with reference to FIG. 14A. The dynamic occupancy graph 1400 includes at least two nodes 1404, 1408 and an edge 1412 connecting the two nodes 1404, 1408. The two nodes 1404, 1408 represent the two adjacent spatiotemporal locations 1420, 1416 of the drivable area 1424 including the road 1428. The two adjacent spatiotemporal locations 1420, 1416 and the road 1428 are illustrated and described in more detail with reference to FIG. 14A.

In an embodiment, generating the dynamic occupancy graph 1400 includes allocating a portion of the LiDAR data 504a to the at least two nodes 1404, 1408. The portion of the LiDAR data 504a corresponds to an object 608. An object is typically larger than a single node and is distributed over more than one node. The dynamic occupancy graph 1400 is a graphical representation of a DOG, for example, the DOG 1300. Each grid cell 1305, 1310 corresponds to a node 1404, 1408 of the graphical representation 1400. The grid cells 1305, 1310 are illustrated and described in more detail with reference to FIG. 13. The DOG 1300 cubes can thus be described by the dynamic occupancy graph 1400, where each cube corresponds to a node and two adjacent cubes are characterized by an edge 1412 on the dynamic occupancy graph 1400. The edge 1412 can be assigned a value representing a dynamic interaction between the nodes 1404, 1408.

In an embodiment, the DOG circuit updates the dynamic occupancy graph 1400 using recursive Bayesian analysis on the LiDAR data 504a. The DOG circuit continuously or periodically updates occupancy probabilities for each node 1404, 1408 based on the LiDAR returns 504a. Pre-computed template waveforms generated using historical LiDAR can be stored and compared to the observed dynamic occupancy graph 1400 waveforms to determine characteristics of the environment 190 the AV 100 is navigating in.

The DOG circuit generates a particle distribution function of multiple particles based on LiDAR data 504a received from one or more LiDARs 502a of the AV 100. The LiDAR data 504a and LiDARs 502a are illustrated and described in more detail with reference to FIG. 5. The multiple particles represent at least one object 608 in the drivable area 1424. The edge 1412 of the dynamic occupancy graph 1400 represents motion of the at least one object 608 between the two adjacent spatiotemporal locations 1420, 1416 of the drivable area. The dynamic state of the nodes 1404, 1408 can be addressed, for example, by modeling objects 608 such as vehicles 193 or pedestrians 192 as a collection of particles. The DOG circuit generates a velocity of the object 608 relative to the AV 100 based on the particle distribution function. The modeling is akin to how fluid is modeled in field theory-based fluid dynamics. The term particles, as used herein, do not refer to physical units of matter. Rather, the particles represent a set of interacting variables, forming a virtual representation of objects 608, e.g., vehicles 193, pedestrians 192, or free space in the environment 190 of the AV 100.

In an embodiment, generating the particle distribution function includes adjusting a probability that a portion of the drivable area 1424 is occupied by the object 608 to greater than zero. In an embodiment, the DOG circuit updates the particle distribution function based on models of the one or more LiDARs 123. For example, the updated particle distribution functions are used in conjunction with forward sensor models associated with the corresponding sensors 123 to generate predictions on the probability of occupancy of the various nodes 1404, 1408.

In an embodiment, the DOG circuit validates the velocity of the object 608 relative to the AV 100 against RADAR data 504b received using one or more RADARs 502b of the AV 100. The RADAR data 504b and RADAR 502b is illustrated and described in more detail with reference to FIG. 5. The particle distribution function can be a function of seven variables f(x, y, z, $v_x$, $v_y$, $v_z$, t). Here, x refers to the position on the X axis, y refers to the position on the Y axis, z refers to the position on the Z axis, $v_x$ refers to the velocity on the X axis, $v_y$ refers to the velocity on the Y axis, $v_z$ refers to the velocity on the Z axis, and t refers to time. The particle distribution function is thus a number of particles per unit volume having the velocity ($v_x$, $v_y$, $v_z$) at the position r=(x, y, z) at time t. In an embodiment, the DOG circuit monitors a flow of the particles through the dynamic occupancy graph 1400 based on the LiDAR data 504a. Instead of tracking individual particles to determine the occupancy of nodes 1404, 1408, the DOG circuit monitors the flow of particles through the dynamic occupancy graph 1400 by determining the probability of occupancy of the nodes 1404, 1408 by tracking statistics of particle distribution functions.

In an embodiment, the DOG circuit determines a state of each node (e.g., node 1404) of the dynamic occupancy graph 1400 based on the particle distribution function. The states of the nodes 1404, 1408 depend on the parameters of the joint distribution of the particles as they traverse the nodes 1404, 1408. In an embodiment, generating the particle distribution function includes determining a solution to a differential equation defined by a parameter of the particle distribution function. For example, a Eulerian solver is used to determine the time-varying joint distributions by computing solutions to differential equations defined on the one or more particle-dynamics parameters obtained using the one or more sensors 121, 122, 123.

In an embodiment, generating the particle distribution function includes determining a probability that the at least one object 608 occupies at least one of the two adjacent spatiotemporal locations 1420, 1416 of the drivable area 1424. Where the DOG circuit "perceives" targets (object 608) along the trajectory 198 (edge 1412), the DOG circuit will "populate" the edge 1412 as "occupied" with an associated probability. In an embodiment, generating the particle distribution function includes determining a number of the particles per unit volume in at least one of the two adjacent spatiotemporal locations 1416, 1420 of the drivable area 1424. Each node 1404, 1408 is a single-particle phase space. Each node 1404 can contain an occupancy probability, a confidence, or a range rate (how fast is the object 608 approaching the AV 100).

In an embodiment, the DOG circuit determines an observation vector for a node 1404 of the at least two nodes 1404, 1408 based on the LiDAR data 504a. The observation vector includes a density of particles in a corresponding spatiotemporal location (e.g., the spatiotemporal location 1416) of the two adjacent spatiotemporal locations 1416, 1420 of the drivable area 1424. The particle distribution function specifies a probability of a random variable falling within a particular range of values. This probability is given by the integral of the variable's particle distribution function over the range. That is, the probability is determined as an area under the particle distribution function but above the horizontal axis and between the lowest and greatest values of the range. The particle distribution function is nonnegative everywhere, and its integral over the entire space is equal to 1. In an embodiment, the observation vector further includes a velocity component of the particles in the corresponding spatiotemporal location 1416 and a covariance of the particle distribution function. The LiDAR data 504*a* includes velocity information along the X and Y directions. The DOG circuit generates the observation vector that includes the density of the particles in the node 1404, the velocity components along the X and Y directions, and the covariances.

The DOG circuit determines a TTC of the AV 100 and the at least one object 608 based on the particle distribution function. For example, the dynamic occupancy graph 1400 represents a one-dimensional view along the forward-intended path (trajectory 198) of the AV 100. Responsive to determining that the TTC is less than a threshold time, the DOG circuit transmits a collision warning to a control circuit 406 of the AV 100 to avoid a collision of the AV 100 and the at least one object 608. The control circuit 406 is illustrated and described in more detail with reference to FIG. 4. In an embodiment, the DOG circuit determines a minimum TTC and a mean TTC of the AV 100 and the at least one object 608 based on the particle distribution function. The DOG circuit 1300 uses a constant acceleration model to determine the minimum and mean TTCs.

In an embodiment, the DOG circuit receives control data from the control circuit 406. The control data includes an angle of a steering control 102 or a steering input 1108 of the AV 100. The steering control 102 is illustrated and described in more detail with reference to FIG. 1. The steering input 1108 is illustrated and described in more detail with reference to FIG. 11. The DOG circuit determines a spatiotemporal location (e.g., the spatiotemporal location 1416) of the AV 100 within the drivable area. In an embodiment, the control data includes an angular velocity of the steering control 102. For example, the DOG circuit requests the steering wheel angle and the steering wheel angular velocity from the control module 406. The DOG circuit uses the steering wheel parameters to determine where the AV 100 is located.

In an embodiment, the DOG circuit operates separately and independently of the AV stack for redundancy. In an embodiment, the DOG circuit transmits the collision warning to the control circuit 406 via an arbiter circuit of the AV 100. The DOG circuit also periodically transmits a heartbeat signal to the arbiter circuit. The intent of the heartbeat signal is to communicate that the DOG circuit is functioning or processing as expected, and is not in a hung, crashed, or delayed state. The heartbeat signal can be implemented in different ways. One way is an alternating high and low signal at an expected frequency.

In an embodiment, the dynamic occupancy graph 1400 is generated in accordance with a coordinate frame of the AV 100. For example, the DOG circuit operates within the ego-vehicle's (AV 100's) local coordinate frame. In an embodiment, generating the dynamic occupancy graph 1400 is based on a spatiotemporal location (e.g., the spatiotemporal location 1416) of the AV 100 within the drivable area. For example, the AV 100 is driving down a road. The DOG circuit receives a trajectory 198 from the planning module 404. The planning module 404 is illustrated and described in more detail with reference to FIG. 4. The DOG circuit examines the width of the AV 100 within the trajectory 198 and senses no object 608, a faraway object 608, or an object 608 leaving the trajectory 198. The DOG circuit generates the dynamic occupancy graph 1400 having nodes 1404, 1408 having a lower occupancy probability and a larger mean TTC. The DOG circuit transmits a heartbeat message to the arbiter circuit and does not send a brake pre-charge or a deceleration request to the control module 406.

Figure 16:
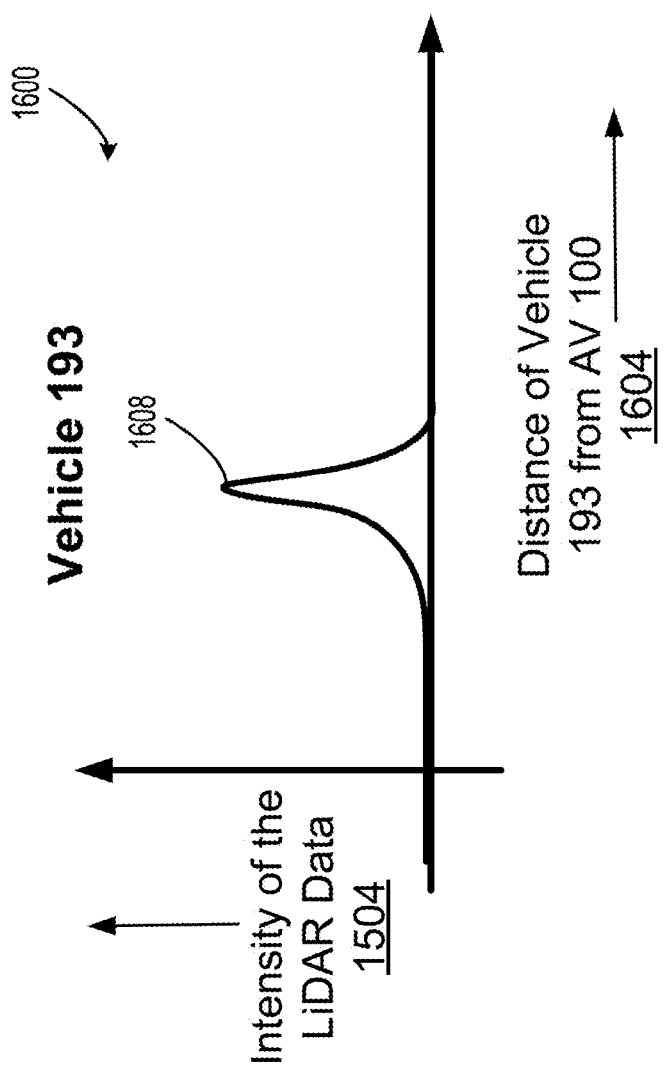
FIG. 16 illustrates a DOG waveform representing a vehicle, in accordance with one or more embodiments.

FIG. 15 illustrates a dynamic occupancy grid (DOG) waveform 1500 representing a pedestrian 192, in accordance with one or more embodiments. The pedestrian 192 is illustrated and described in more detail with reference to FIG. 1. The waveform 1500 is extracted from a DOG (e.g., the DOG 1300, illustrated and described in more detail with reference to FIG. 13). The DOG 1300 includes multiple 3D grid cubes (or 2D grid cells) 1305, 1310. FIG. 16 illustrates a DOG waveform 1600 representing a vehicle 193, in accordance with one or more embodiments. The vehicle 193 is illustrated and described in more detail with reference to FIG. 1. The waveform 1600 is extracted from a DOG (e.g., the DOG 1300, illustrated and described in more detail with reference to FIG. 13).

The DOG circuit generates a DOG (e.g., the DOG 1300) based on first LIDAR data 504*a* received from a LIDAR 502*a* of the AV 100. In an embodiment, the LiDAR 502*a* includes a phased array and the first LiDAR data 504*a* includes time, frequency, and phase information. The LiDAR 502*a* uses a phased array so the returns include time, frequency, and phase of light 1508 information. The first LIDAR data 504*a* and the LIDAR 502*a* are illustrated and described in more detail with reference to FIG. 5. In an embodiment, generating the DOG 1300 includes fusing sensor data received from sensors 121, 122 of the AV 100 with the first LIDAR data 504*a* using Bayesian filtering to represent the pedestrian 192 across multiple grid cells 1305, 1310 of the DOG 1300. The sensors 121, 122 are illustrated and described in more detail with reference to FIG. 1. The grid cells 1305, 1310 are illustrated and described in more detail with reference to FIG. 13. The DOG circuit uses Bayesian filtering to fuse a variety of sensors 121, 122, 123 and represent an object 608 across multiple grid cells 1305, 1310. In an embodiment, the DOG 1300 is generated based on irregular sampling of a semantic map of the environment 190.

In an embodiment, each grid cube 1305 of the multiple grid cubes 1305, 1310 of the DOG 1300 includes a probabilistic occupancy estimate and a velocity estimate of the pedestrian 192. In an embodiment, the DOG 1300 represents an area within a border of the environment 192 and each grid cube 1305 of the multiple grid cubes 1305, 1310 has a width. The grid cubes 1303, 1310 have a static position and a width. The border of the environment 190 is shifted by the width to keep the moving AV 100 within a center of the DOG 1300. In an embodiment, the DOG circuit adjusts a representation of the border of the environment 190 within the DOG 1300 by the width, such that a representation of the pedestrian 192 is located within the DOG 1300.

In an embodiment, the DOG circuit determines a phase shift of the first LiDAR data 504*a*. The first LiDAR data 504*a* is a phase-modulated (varied) signal. The DOG circuit can measure the phase shift in the phase-modulated signal. The DOG circuit includes a particle filter that is executed by one or more processors of the DOG circuit to generate a waveform 1500 from the DOG 1300. A portion of the DOG 1300 corresponding to an object in the environment 190 is extracted and stored in an embedded library in the AV 100 as a labeled waveform. The environment 190 is illustrated and described in more detail with reference to FIG. 1. The waveform 1500 includes a variation of an intensity 1504 of the LiDAR data 504*a* with a phase of light 1508 of the LiDAR 502*a*. In an embodiment, the waveform 1500 represents the pedestrian 192 interacting with a second object (e.g., the vehicle 193). The embedded system in the AV 100 stores many possible signal waveforms. The DOG circuit extracts information from the observed waveforms 1500, 1600 and compares the information to stored waveforms to find a match (for example, a pedestrian 192, a vehicle 193, etc.). The comparisons can detect complex scenarios with multiple road users, e.g., pedestrians 192, bikes, and motor vehicles interacting with each other.

The DOG circuit matches the waveform 1500 against a library of waveforms extracted from historical LiDAR data reflected from one or more objects 608 to identify that the first LiDAR data 504a is reflected from a particular object (the pedestrian 192) of the one or more objects 608. The one or more objects 608 are illustrated and described in more detail with reference to FIG. 6. The DOG circuit updates the waveform 1500 based on second LiDAR data (an updated version of the first LiDAR data 504a) received from the LiDAR 502a of the AV 100 after the first LiDAR data 504a is received. The DOG circuit determines a range rate of the AV 100 and the pedestrian 192 based on the updated waveform 1500. A control circuit 406 of the AV 100 operates the AV 100 to avoid a collision with the pedestrian 192 based on the range rate of the AV 100 and the pedestrian 192.

In an embodiment, matching the waveform 1500 against the library of waveforms includes extracting a feature vector from the waveform 1500. The DOG circuit identifies the pedestrian 192 from the one or more objects 608 using a machine learning model. Past, pre-computed template waveforms are stored and compared to the observed DOG waveform 1500 from the LiDAR data 504a to determine characteristics of the environment 190 the AV 100 is navigating in a computationally efficient manner. In an embodiment, the DOG circuit trains the machine learning model based on feature vectors extracted from the historical LiDAR data. The machine learning model can extract features from an observed waveform 1500 to compare to a stored waveform. The machine learning model can be trained on the labeled, stored waveforms.

In an embodiment, the DOG circuit determines a probabilistic occupancy distribution and a velocity distribution across the DOG 1300 disregarding interaction of the historical LIDAR data between the multiple grid cubes 1305, 1310. The library generation includes multiple steps. The LiDAR returns are converted into the DOG 1300. The particle filter estimates the spatial occupancy and velocity distribution. Each grid cube 1305 is updated independently and no interaction between the multiple grid cubes 1305, 1310 is modeled.

In an embodiment, the particle filter extracts the waveform 1600 from the DOG 1300. The waveform 1600 includes a variation of the intensity 1504 of the LiDAR data 504a with a distance 1604 of a particular object (e.g., vehicle 193) from the AV 100. If a grid cube 1305 is occupied, the LiDAR data 504a signal will have a specific distribution indicating this. If the grid cube 1305 is not occupied, the grid cube 1305 will contain noise that will not match the distribution. In the waveform 1600, a higher peak 1608 corresponds to a higher density of reflected points. The Y axis (intensity 1504 of the LiDAR data 504a) corresponds to occupancy probability. Hence, the waveform 1600 peaks where points of the LiDAR data 504a are clustered, indicating a higher probability of the presence of the vehicle 193.

In an embodiment, the particle filter extracts a waveform from the DOG 1300 including a variation of the probabilistic occupancy estimate with the distance 1604 of the vehicle 193 from the AV 100. The waveform include a probability of occupancy of a grid cube (e.g., the grid cube 1305) that is a particular distance from the AV 100. The waveform includes a variation of the probability density of occupation plotted against the distance 1604 of an object 608 from the AV 100. In embodiment, the particle filter extracts a waveform from the DOG 1300 including a variation of the probabilistic occupancy estimate with the phase of light 1508 of the LiDAR data 504a.

In an embodiment, an intensity of particular LiDAR data 504a corresponding to a particular grid cube 1305 of the multiple grid cubes 1305, 1310 of the DOG 1300 is represented by a. A first conditional probability that the intensity of the particular LiDAR data 504a corresponding to the particular grid cube 1305 of the multiple grid cubes 1305, 1310 of the DOG 1300 is greater than a threshold intensity when a portion of the environment 190 represented by the particular grid cube 1305 is occupied by a particular object (e.g., the vehicle 193) is represented by P(α|occupied). The DOG circuit determines the value of P(α|occupied) from the DOG 1300. The DOG circuit further determines a second conditional probability P(α|free) that the intensity of the particular LiDAR data 504a corresponding to the particular grid cube 1305 of the multiple grid cubes 1305, 1310 of the DOG 1300 is greater than the threshold intensity when the portion of the environment 190 represented by the particular cube 1305 is free of the vehicle 193. The DOG circuit determines that the portion of the environment 190 represented by the particular grid cube 1305 is indeed occupied by the vehicle 193 based on the first conditional probability P(α|occupied) and the second conditional probability P(α|free). Thus, the DOG circuit determines whether a grid cube is occupied by an object 608 by comparing two mutually exclusive models. The conditional probabilities P(α|occupied) and P(α|free) are the two mutually exclusive models under comparison.

FIG. 17 is a flow diagram illustrating a process for operation of the AV 100, in accordance with one or more embodiments. In an embodiment, the process of FIG. 17 is performed by the DOG circuit, described in more detail with reference to FIG. 13. Other entities, for example, the perception module 402 or the planning module 404 perform some or all of the steps of the process in other embodiments. Likewise, embodiments may include different and/or additional steps, or perform the steps in different orders. The perception module 402 and the planning module 404 are illustrated and described in more detail with reference to FIG. 4.

The DOG circuit receives 1704 LiDAR data 504a from one or more LiDARs 502a of the AV 100. The LiDAR data 504a and LiDAR 502a are illustrated and described in more detail with reference to FIG. 5. The LiDAR data 504a represents one or more objects 608 located in the environment 190. The environment 190 is illustrated and described in more detail with reference to FIG. 1. The one or more objects 608 are illustrated and described in more detail with reference to FIG. 6.

The DOG circuit generates 1708 the DOG 1300 based on a semantic map of the environment 190. The DOG 1300 is illustrated and described in more detail with reference to FIG. 13. The DOG 1300 includes multiple grid cells 1305, 1310. The grid cells 1305, 1310 are illustrated and described in more detail with reference to FIG. 13. Each grid cell 1305 of the multiple grid cells 1305, 1310 represent a portion of the environment 190.

For each grid cell 1305 of the multiple grid cells 1305, 1310, the DOG circuit generates 1712 a probability density function based on the LiDAR data 504a. The probability density function represents a probability that the portion of the environment 190 represented by the grid cell 1305 is occupied by an object (e.g., the vehicle 193) of the one or more objects 608. The vehicle 193 is illustrated and described in more detail with reference to FIG. 1.

The DOG circuit determines 1716 that a time-to-collision (TTC) of the AV 100 and the vehicle 193 is less than a threshold time based on the probability density function. The probability density function (sometimes referred to as a particle density function) describes a number of identically distributed and independent particles inside a volume of the state space. Because particles are considered to be identical, an inherent assumption of the technology described herein is that sensor measurements are not used to distinguish between particles. Rather, sensor measurements are defined as a probability of observation γ given a particle is located at x. This measurement can be referred to as a forward sensor model, and denoted as p(γ|x).

Responsive to determining that the TTC is less than the threshold time, the control circuit 406 operates the AV 100 to avoid a collision of the AV 100 and the vehicle 193. The control circuit 406 is illustrated and described in more detail with reference to FIG. 4.

FIG. 18 is a flow diagram illustrating a process for operation of the AV 100, in accordance with one or more embodiments. The AV 100 is illustrated and described in more detail with reference to FIG. 1. In an embodiment, the process of FIG. 18 is performed by the DOG circuit, described in more detail with reference to FIG. 13. Other entities, for example, the perception module 402 or the planning module 404 perform some or all of the steps of the process in other embodiments. Likewise, embodiments may include different and/or additional steps, or perform the steps in different orders. The perception module 402 and the planning module 404 are illustrated and described in more detail with reference to FIG. 4.

The DOG circuit generates 1804 a dynamic occupancy graph 1400 representing a drivable area 1424 along a trajectory 198 of the AV 100. The dynamic occupancy graph 1400 is illustrated and described in more detail with reference to FIG. 14B. The drivable area 1424 is illustrated and described in more detail with reference to FIG. 14A. The trajectory 198 is illustrated and described in more detail with reference to FIG. 1. The dynamic occupancy graph 1400 includes at least two nodes 1404, 1408 and an edge 1412 connecting the two nodes 1404, 1408. The nodes 1404, 1408 are illustrated and described in more detail with reference to FIG. 14B. The edge 141 is illustrated and described in more detail with reference to FIG. 14B. The two nodes 1404, 1408 represent two adjacent spatiotemporal locations 1416, 1420 of the drivable area 1424. The two adjacent spatiotemporal locations 1416, 1420 are illustrated and described in more detail with reference to FIG. 14A.

The DOG circuit generates 1808 a particle distribution function of multiple particles based on LiDAR data 504a received from one or more LiDARs 502a of the AV 100. The LiDAR data 504a and LiDAR 502a are illustrated and described in more detail with reference to FIG. 5. The multiple particles represent at least one object 608 in the drivable area 1424. The object 608 is illustrated and described in more detail with reference to FIG. 6. The edge 1412 of the dynamic occupancy graph 1400 represents motion of the at least one object 608 between the two adjacent spatiotemporal locations 1416, 1420 of the drivable area 1424.

The DOG circuit generates 1812 a velocity of the object 608 relative to the AV 100 based on the particle distribution function. The modeling is akin to how fluid is modeled in field theory-based fluid dynamics. The term particles, as used herein, do not refer to physical units of matter. Rather, the particles represent a set of interacting variables, forming a virtual representation of objects 608, e.g., vehicles 193, pedestrians 192, or free space in the environment 190 of the AV 100.

The DOG circuit 1816 determines a time-to-collision (TTC) of the AV 100 and the at least one object 608 based on the particle distribution function. In an embodiment, generating the particle distribution function includes adjusting a probability that a portion of the drivable area 1424 is occupied by the object 608 to greater than zero. In an embodiment, the DOG circuit updates the particle distribution function based on models of the one or more LiDARs 123. For example, the updated particle distribution functions are used in conjunction with forward sensor models associated with the corresponding sensors 123 to generate predictions on the probability of occupancy of the various nodes 1404, 1408.

Responsive to determining that the TTC is less than a threshold time, the DOG circuit transmits a collision warning to a control circuit 406 of the AV 100 to avoid a collision of the AV 100 and the at least one object 608. The control circuit 406 is illustrated and described in more detail with reference to FIG. 6.

Figure 19:
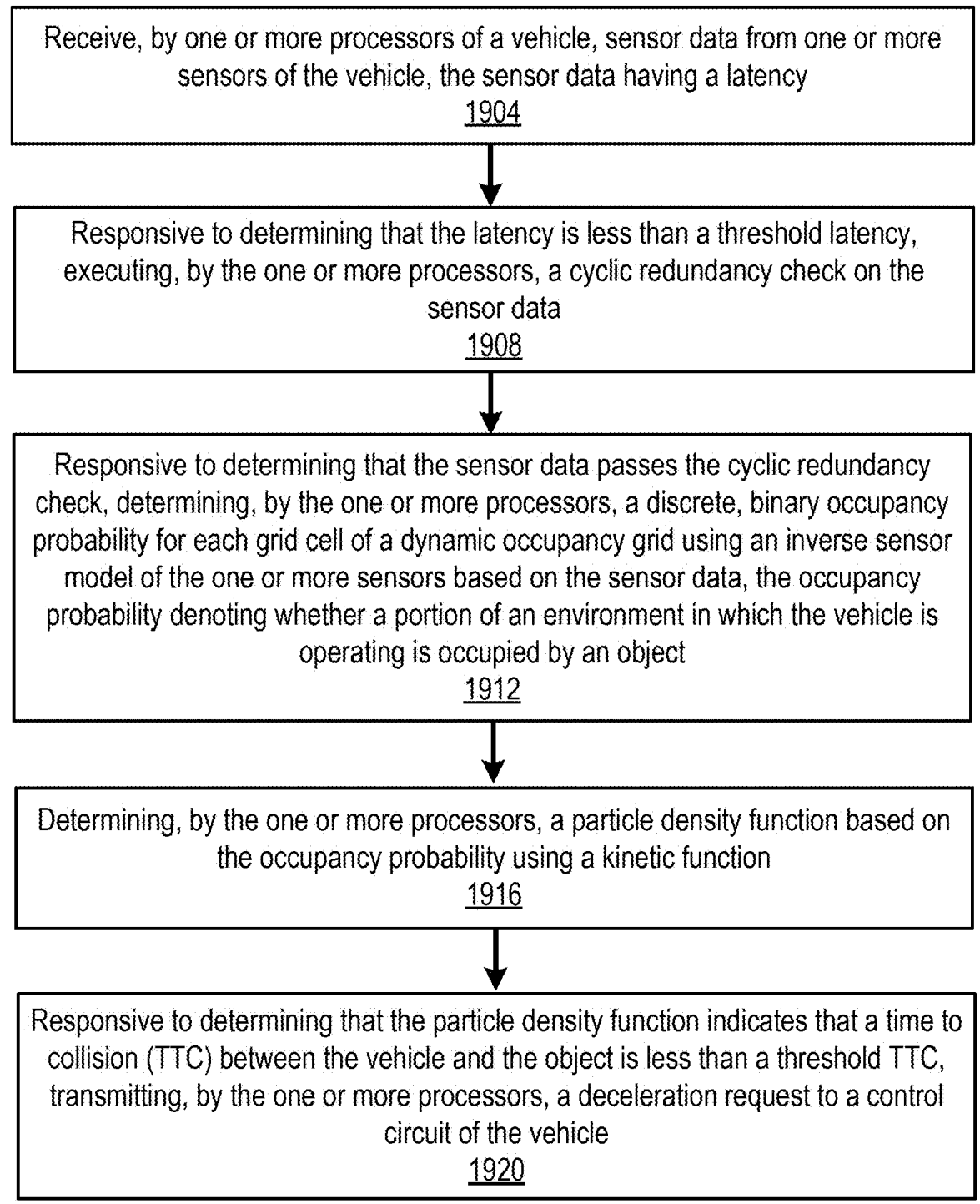
FIG. 19 is a flow diagram illustrating a process for operation of a vehicle, in accordance with one or more embodiments.

FIG. 19 is a flow diagram illustrating a process for operation of the AV 100, in accordance with one or more embodiments. The AV 100 is illustrated and described in more detail with reference to FIG. 1. In an embodiment, the process of FIG. 18 is performed by the DOG circuit, described in more detail with reference to FIG. 13. Other entities, for example, the perception module 402 or the planning module 404 perform some or all of the steps of the process in other embodiments. Likewise, embodiments may include different and/or additional steps, or perform the steps in different orders. The perception module 402 and the planning module 404 are illustrated and described in more detail with reference to FIG. 4.

The DOG circuit receives 1904 sensor data from one or more sensors 121, 122, 123 of the AV 100. The one or more sensors 121, 122, 123 are illustrated and described in more detail with reference to FIG. 1. The sensor data has an associated latency from the time of capture (that can be encoded into the data) as it is transmitted from the sensors 121, 122, 123 to the DOG circuit (optionally through the perception module 402).

Responsive to determining that the latency is less than a threshold latency, the DOG circuit executes 1908 a cyclic redundancy check on the sensor data. For example, the DOG circuit checks the quality of the sensor data signals, such as timing (e.g., latency) of the path data or a protocol of the path data. The path data refers to sensor data describing the physical path the AV 100 is traversing. If the DOG circuit determines that the sensor data is of poor quality, the DOG circuit can send a "failed sensor data" signal to an arbiter module of a safety system or to the AV stack (AV navigation system).

Responsive to determining that the sensor data passes the cyclic redundancy check, the DOG circuit determining 1912 a discrete, binary occupancy probability for each grid cell 1305 of a DOG 1300 using an inverse sensor model of the one or more sensors 121, 122, 123 based on the sensor data. The grid cell 1305 and DOG 1300 are illustrated and described in more detail with reference to FIG. 13. The occupancy probability denotes whether a portion of an environment 190 in which the AV 100 is operating is occupied by an object 608. The environment 190 is illustrated and described in more detail with reference to FIG. 1. The object 608 is illustrated and described in more detail with reference to FIG. 6.

The DOG circuit determines 1916 a particle density function based on the occupancy probability using a kinetic function. For example, the DOG circuit determines the cube occupancy cumulative distribution function. Evolution of the particle density function over time can be modeled using kinetic equations such as Boltzmann equations for the probability density function.

Responsive to determining that the particle density function indicates that a time to collision (TTC) between the AV 100 and the object 608 is less than a threshold TTC, the DOG circuit transmits a deceleration request to a control circuit 406 of the AV 100.

FIG. 20 is a flow diagram illustrating a process for operation of the AV 100, in accordance with one or more embodiments. The AV 100 is illustrated and described in more detail with reference to FIG. 1. In an embodiment, the process of FIG. 18 is performed by the DOG circuit, described in more detail with reference to FIG. 13. Other entities, for example, the perception module 402 or the planning module 404 perform some or all of the steps of the process in other embodiments. Likewise, embodiments may include different and/or additional steps, or perform the steps in different orders. The perception module 402 and the planning module 404 are illustrated and described in more detail with reference to FIG. 4.

The DOG circuit generates 2004 a DOG 1300 based on first LIDAR data 504a received from a LIDAR 502a of the AV 100. The DOG 1300 is illustrated and described in more detail with reference to FIG. 13. The LIDAR data 504a and LIDAR 502a are illustrated and described in more detail with reference to FIG. 5.

A particle filter executed by one or more processors of the DOG circuit extracts 2008 a waveform 1500 from the DOG 1300. The waveform 1500 is illustrated and described in more detail with reference to FIG. 15. The waveform 1500 includes a variation of an intensity 1504 of the LiDAR data 504a with a phase of light 1508 of the LiDAR 502a. The intensity 1504 of the LiDAR data 504a and the phase of light 1508 are illustrated and described in more detail with reference to FIG. 15.

The DOG circuit matches 2012 the waveform 1500 against a library of waveforms extracted from historical LiDAR data reflected from one or more objects 608 to identify that the first LiDAR data 504a is reflected from a particular object (e.g., the pedestrian 192) of the one or more objects 608. The one or more objects 608 are illustrated and described in more detail with reference to FIG. 6. The pedestrian 192 is illustrated and described in more detail with reference to FIG. 1.

The DOG circuit updates 2016 the waveform 1500 based on second LiDAR data (an updated version of the first LiDAR data 504a) received from the LiDAR 502a of the AV 100 after the first LiDAR data 504a is received.

The DOG circuit determines 2020 a range rate of the AV 100 and the pedestrian 192 based on the updated waveform 1500. The range rate of the AV 100 and the pedestrian 192 indicates how fast the AV 100 is approaching the pedestrian 192.

A control circuit 406 of the AV 100 operates 2024 the AV 100 to avoid a collision with the pedestrian 192 based on the range rate of the AV 100 and the pedestrian 192. The control circuit 406 is illustrated and described in more detail with reference to FIG. 4.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
   generating, by one or more processors of a vehicle, a dynamic occupancy graph representing a drivable area along a trajectory of the vehicle, the dynamic occupancy graph comprising at least two nodes and an edge connecting the two nodes, the two nodes representing two adjacent spatiotemporal locations of the drivable area;
   generating, by the one or more processors, a particle distribution function of a plurality of particles based on LiDAR data received from one or more LiDARs of the vehicle, the plurality of particles representing at least one object in the drivable area, the edge of the dynamic occupancy graph representing motion of the at least one object between the two adjacent spatiotemporal locations of the drivable area;
   generating, by the one or more processors, a velocity of the object relative to the vehicle based on the particle distribution function;
   determining, by the one or more processors, a time-to-collision of the vehicle and the at least one object based on the particle distribution function; and
   responsive to determining that the time-to-collision is less than a threshold time, transmitting, by the one or more processors, a collision warning to a control circuit of the vehicle to avoid a collision of the vehicle and the at least one object.

2. The method of claim 1, wherein the dynamic occupancy graph is generated in accordance with a coordinate frame of the vehicle.

3. The method of claim 1, wherein the generating of the particle distribution function comprises determining, by the one or more processors, a probability that the at least one object occupies at least one of the two adjacent spatiotemporal locations of the drivable area.

4. The method of claim 1, wherein the generating of the particle distribution function comprises determining, by the one or more processors, a number of the plurality of particles per unit volume in at least one of the two adjacent spatiotemporal locations of the drivable area.

5. The method of claim 1, wherein the one or more processors transmit the collision warning to the control circuit via an arbiter circuit of the vehicle, the method further comprising periodically transmitting, by the one or more processors, a heartbeat signal to the arbiter circuit.

6. The method of claim 1, further comprising validating, by the one or more processors, the velocity of the object relative to the vehicle against RADAR data received using one or more RADARs of the vehicle.

7. The method of claim 1, further comprising determining, by the one or more processors, a minimum time-to-collision (TTC) and a mean TTC of the vehicle and the at least one object based on the particle distribution function.

8. The method of claim 1, further comprising:
receiving, by the one or more processors, control data from the control circuit, the control data comprising an angle of a steering wheel of the vehicle; and
determining, by the one or more processors, a spatiotemporal location of the vehicle within the drivable area.

9. The method of claim 8, wherein the control data further comprises an angular velocity of the steering wheel.

10. The method of claim 1, wherein the generating of the dynamic occupancy graph is based on the spatiotemporal location of the vehicle within the drivable area.

11. The method of claim 1, further comprising determining, by the one or more processors, an observation vector for a node of the at least two nodes based on the LiDAR data, the observation vector comprising a density of particles in a corresponding spatiotemporal location of the two adjacent spatiotemporal locations of the drivable area.

12. The method of claim 11, wherein the observation vector further comprises a velocity component of the particles in the corresponding spatiotemporal location and a covariance of the particle distribution function.

13. The method of claim 1, further comprising monitoring, by the one or more processors, a flow of the plurality of particles through the dynamic occupancy graph based on the LiDAR data.

14. The method of claim 1, further comprising determining, by the one or more processors, a state of each node of the dynamic occupancy graph based on the particle distribution function.

15. The method of claim 1, wherein the generating of the particle distribution function comprises determining, by the one or more processors, a solution to a differential equation defined by a parameter of the particle distribution function.

16. The method of claim 1, updating, by the one or more processors, the particle distribution function based on models of the one or more LiDARs.

17. The method of claim 1, wherein the generating of the dynamic occupancy graph comprises allocating, by the one or more processors, a portion of the LiDAR data to the at least two nodes, the portion of the LiDAR data corresponding to the object.

18. The method of claim 1, wherein the generating of the particle distribution function comprises adjusting, by the one or more processors, a probability that a portion of the drivable area is occupied by the object to greater than zero.

19. The method of claim 1, further comprising updating, by the one or more processors, the dynamic occupancy graph using recursive Bayesian analysis on the LiDAR data.

20. An autonomous vehicle comprising:
one or more computer processors; and
one or more non-transitory storage media storing instructions which, when executed by the one or more computer processors, cause the one or more computer processors to;
generate a dynamic occupancy graph representing a drivable area along a trajectory of the autonomous vehicle, the dynamic occupancy graph comprising at least two nodes and an edge connecting the two nodes, the two nodes representing two adjacent spatiotemporal locations of the drivable area;
generate a particle distribution function of a plurality of particles based on LiDAR data received from one or more LiDARs of the autonomous vehicle, the plurality of particles representing at least one object in the drivable area, the edge of the dynamic occupancy graph representing motion of the at least one object between the two adjacent spatiotemporal locations of the drivable area;
generate a velocity of the at least one object relative to the autonomous vehicle based on the particle distribution function;
determine a time-to-collision of the autonomous vehicle and the at least one object based on the particle distribution function; and
responsive to determining that the time-to-collision is less than a threshold time, transmit a collision warning to a control circuit of the autonomous vehicle to avoid a collision of the autonomous vehicle and the at least one object.

21. One or more non-transitory storage media storing instructions which, when executed by one or more computing devices, cause the one or more computing devices to:
generate a dynamic occupancy graph representing a drivable area along a trajectory of a vehicle, the dynamic occupancy graph comprising at least two nodes and an edge connecting the two nodes, the two nodes representing two adjacent spatiotemporal locations of the drivable area;
generate a particle distribution function of a plurality of particles based on LiDAR data received from one or more LiDARs of the vehicle, the plurality of particles representing at least one object in the drivable area, the edge of the dynamic occupancy graph representing motion of the at least one object between the two adjacent spatiotemporal locations of the drivable area;
generate a velocity of the at least one object relative to the vehicle based on the particle distribution function;
determine a time-to-collision of the vehicle and the at least one object based on the particle distribution function; and
responsive to determining that the time-to-collision is less than a threshold time, transmit a collision warning to a control circuit of the vehicle to avoid a collision of the vehicle and the at least one object.

* * * * *